United States Patent
Oyama et al.

(10) Patent No.: US 7,633,844 B2
(45) Date of Patent: Dec. 15, 2009

(54) OPTICAL INFORMATION RECORDING APPARATUS, OPTICAL INFORMATION RECORDING METHOD, AND SIGNAL PROCESSING CIRCUIT

(75) Inventors: Katsuhiro Oyama, Gunma (JP);
Yoshikazu Sato, Gunma (JP);
Tetsuharu Kubo, Gunma (JP); Ryuichi Sunagawa, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 552 days.

(21) Appl. No.: 11/356,803

(22) Filed: Feb. 17, 2006

(65) Prior Publication Data
US 2006/0203646 A1  Sep. 14, 2006

(30) Foreign Application Priority Data
Feb. 21, 2005  (JP) .................. 2005-044147

(51) Int. Cl.
G11B 7/00  (2006.01)
(52) U.S. Cl. .................. 369/47.51; 369/53.31
(58) Field of Classification Search .................. None
See application file for complete search history.

(56) References Cited

U.S. PATENT DOCUMENTS

| | | | | | |
|---|---|---|---|---|---|
| 5,898,656 | A | * | 4/1999 | Takiguchi | 369/47.51 |
| 6,125,084 | A | * | 9/2000 | Sukeda et al. | 369/13.27 |
| 6,240,056 | B1 | * | 5/2001 | Tanase et al. | 369/47.28 |
| 6,288,992 | B1 | * | 9/2001 | Okumura et al. | 369/47.5 |
| 6,359,847 | B1 | * | 3/2002 | Shimizu | 369/53.26 |
| 7,088,663 | B2 | * | 8/2006 | Sasaki et al. | 369/59.11 |
| 2002/0186633 | A1 | * | 12/2002 | Kai et al. | 369/47.51 |
| 2003/0021199 | A1 | * | 1/2003 | Suzuki | 369/47.33 |
| 2004/0141432 | A1 | * | 7/2004 | Toda et al. | 369/43 |
| 2005/0052969 | A1 | * | 3/2005 | Lee | 369/47.5 |
| 2005/0063276 | A1 | * | 3/2005 | Ogura | 369/59.22 |
| 2005/0163007 | A1 | * | 7/2005 | Ueki | 369/47.53 |
| 2006/0077847 | A1 | | 4/2006 | Sato et al. | |

FOREIGN PATENT DOCUMENTS

| | | |
|---|---|---|
| JP | 51-109851 | 9/1976 |
| JP | 53-50707 | 5/1978 |
| JP | 1-287825 | 11/1989 |
| JP | 4-137224 | 5/1992 |
| JP | 5-143999 | 6/1993 |

(Continued)

*Primary Examiner*—Peter Vincent Agustin
(74) *Attorney, Agent, or Firm*—Knobbe Martens Olson & Bear LLP

(57) ABSTRACT

An optical information recording apparatus corrects a recording condition for an optical medium having a difference in recording property between the inner and outer peripheries in real time. The optical information recording apparatus obtains an RF signal by using a playback sub beam and retrieves a portion of the RF signal corresponding to a constant output zone of a recording pulse using a gate signal. An average value of the retrieved signal is computed so as to set a reference position in real time. A difference between the top peak value of the retrieved signal and the average value and a difference between the bottom peak value of the retrieved signal and the average value are computed so as to obtain a β value in real time from the on-and-off RF signal affected by the recording pulse that turns on and off.

12 Claims, 39 Drawing Sheets

FOREIGN PATENT DOCUMENTS

| | | |
|---|---|---|
| JP | 5-144001 | 6/1993 |
| JP | 05-325190 | 12/1993 |
| JP | 7-129956 | 5/1995 |
| JP | 7-235056 | 9/1995 |
| JP | 9-147361 | 6/1997 |
| JP | 10-116474 | 5/1998 |
| JP | 2000-090465 | 3/2000 |
| JP | 2000-123366 | 4/2000 |
| JP | 2002-117544 | 4/2002 |
| JP | 2003-30837 | 1/2003 |
| JP | 2004-22044 | 1/2004 |
| JP | 2004-110995 | 4/2004 |
| JP | 2004-355727 | 12/2004 |
| WO | WO 96/24130 | 8/1996 |

* cited by examiner

FIG. 7A CLK 
FIG. 7B PW1 
FIG. 7C PW2 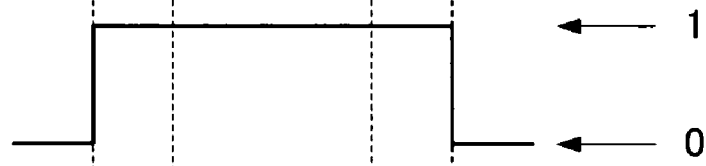
← 1
← 0
FIG. 7D $\overline{PW1}$ 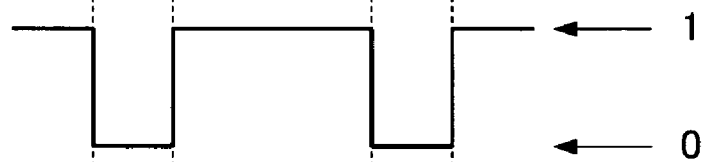
← 1
← 0
FIG. 7E Gate 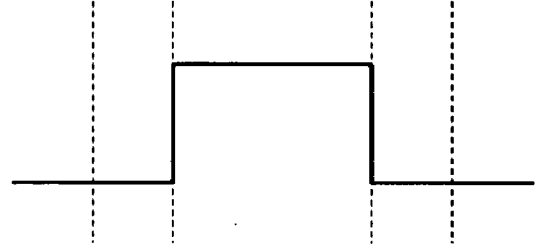

FIG. 11

ORDER OF RECORDING

| Flag | Data |
|---|---|
|  | ... |
|  | P3 |
|  | L5 |
|  | P4 |
|  | L4 |
|  | P8 |
|  | L7 |
|  | P3 |
|  | L5 |
| ○ | P14 |
|  | ... |

CONSTANT OUTPUT ZONE OF 14T (from P4 to P8)

$\tau$ (from P4 to P14)

FIG. 19A (a) RF-Sub' 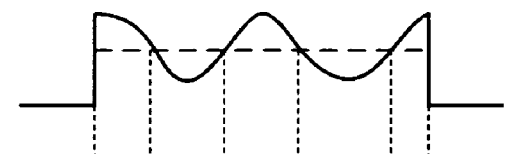
FIG. 19B (b) SL RF-Sub' 
FIG. 19C (c) $\overline{PW1}$ 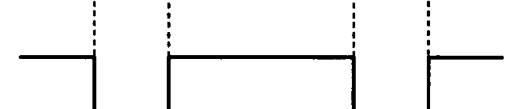
FIG. 19D (d) PW2 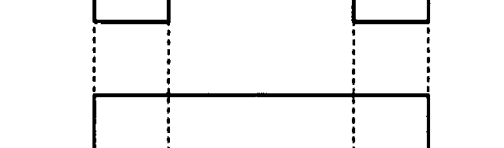
FIG. 19E (e) Gate 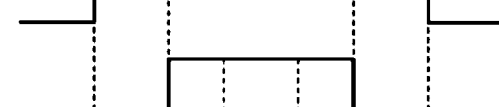
FIG. 19F (f) $\overline{SL\ RF\text{-}Sub'}$ 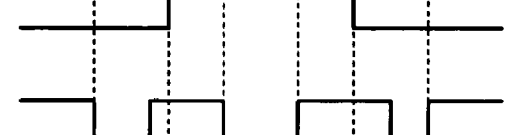
FIG. 19G (g) Detection Enable 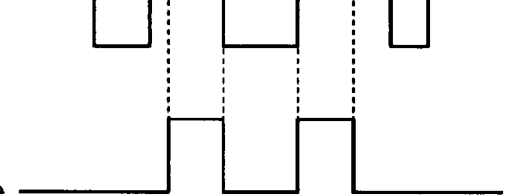

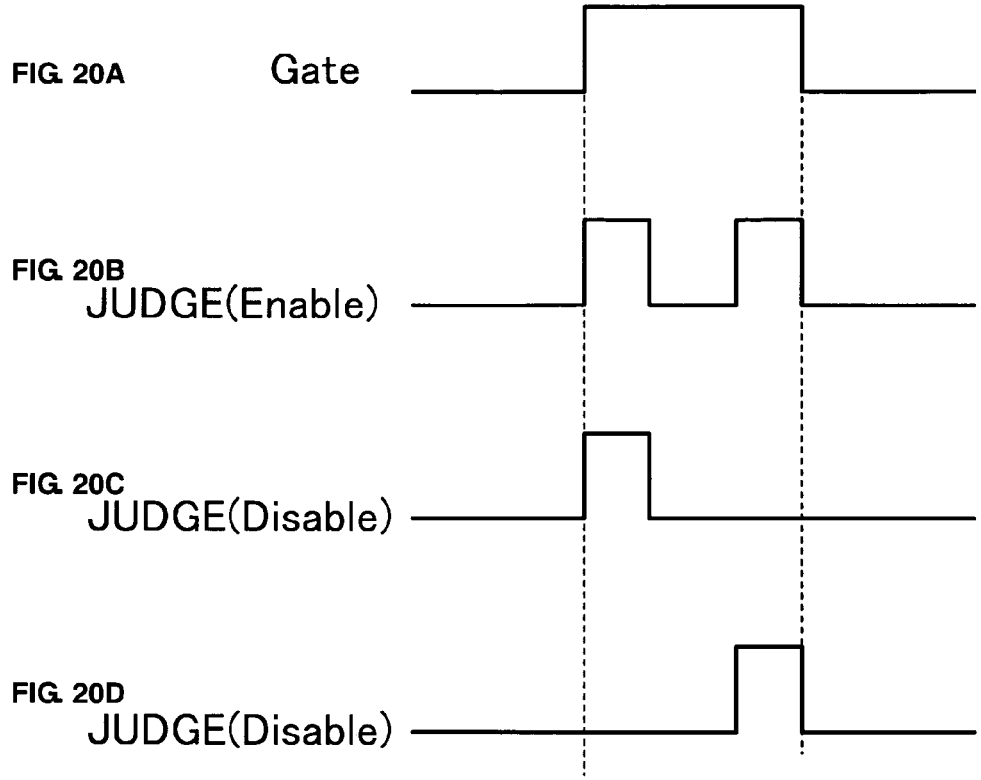

FIG. 22A RF-Sub'
FIG. 22B SL RF-Sub'
FIG. 22C Gate
FIG. 22D CLK
FIG. 22E Countable Pulse
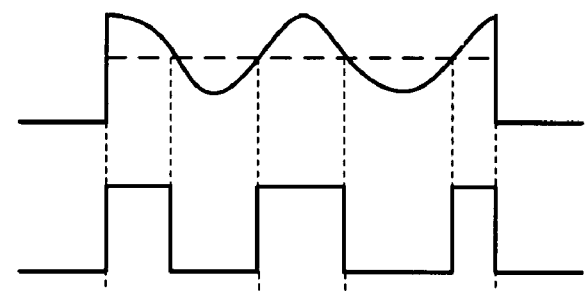
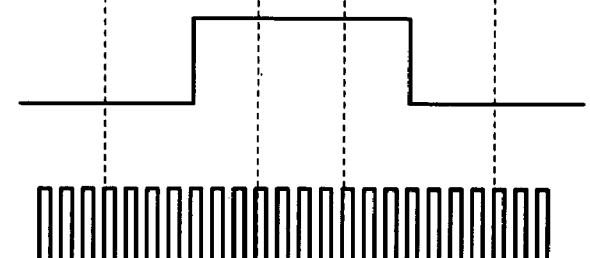
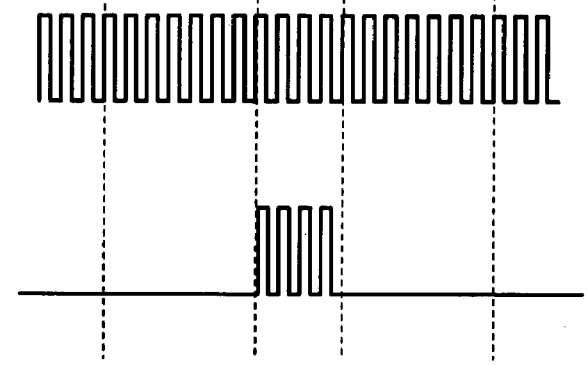

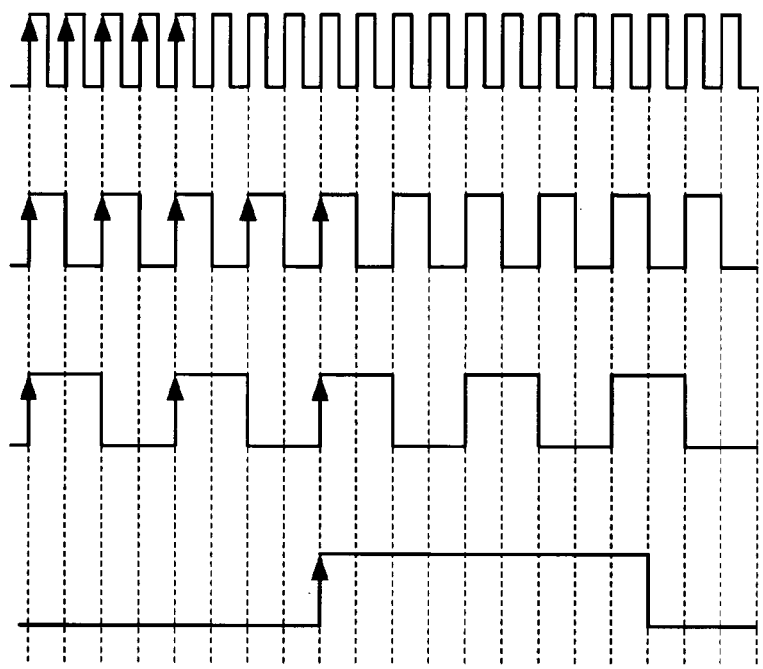
FIG. 23A CLK
FIG. 23B CLK/2
FIG. 23C CLK/4
FIG. 23D Reset

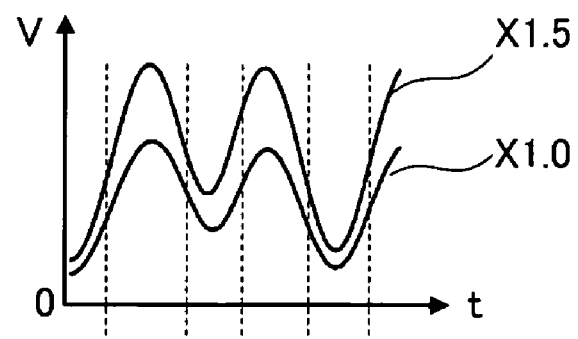
FIG. 25A RF-Sub
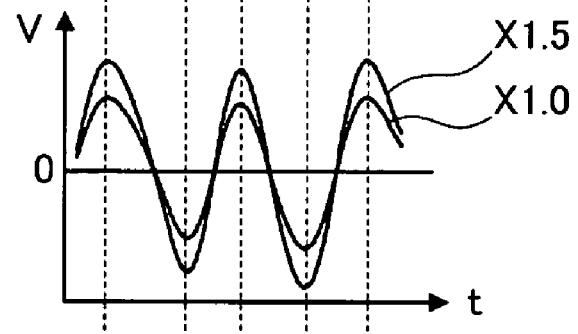
FIG. 25B Tpp-Sub
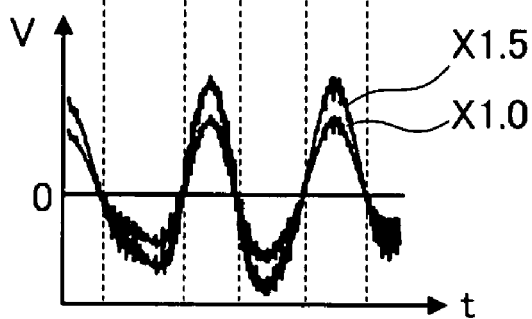
FIG. 25C Δ(Tpp-Sub)

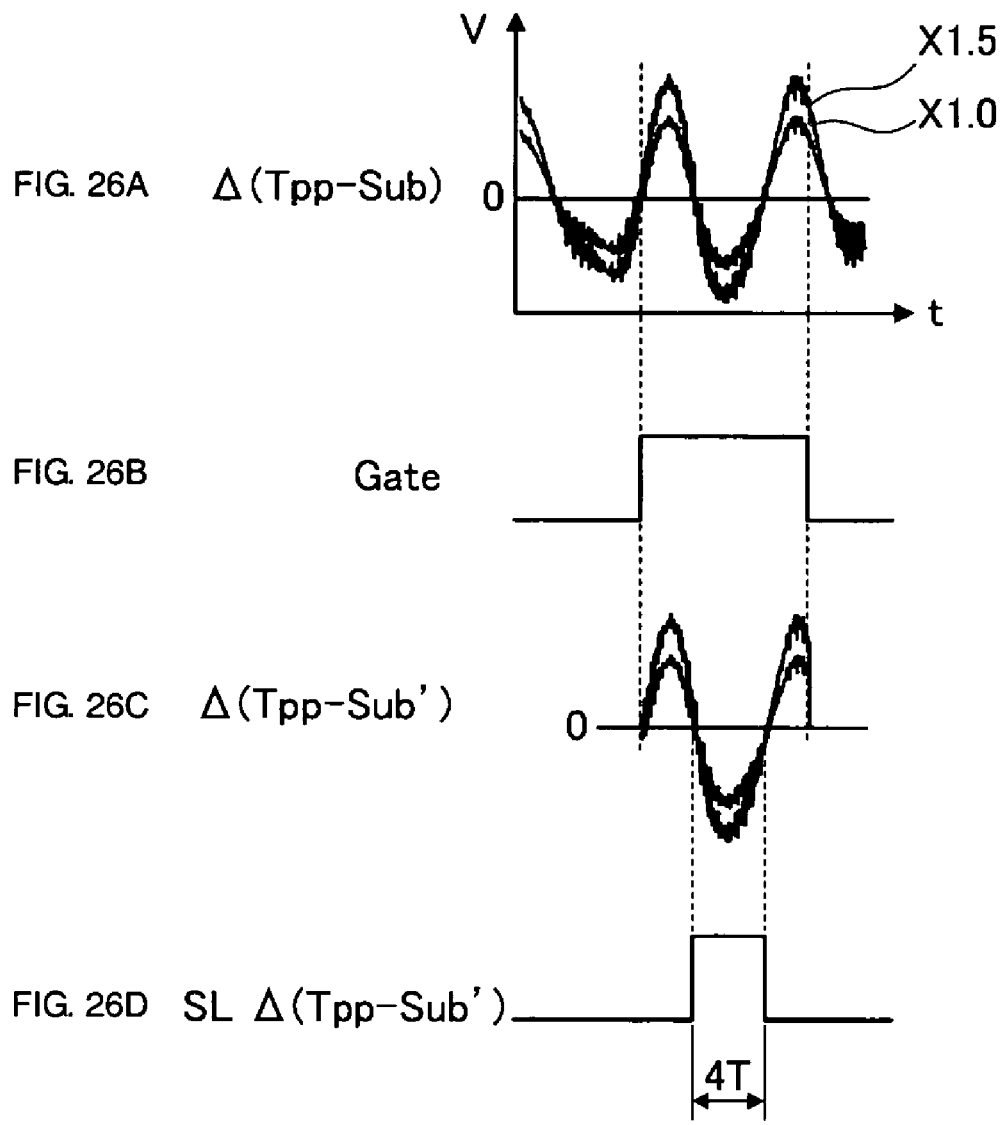

FIG. 28A
FIG. 28B
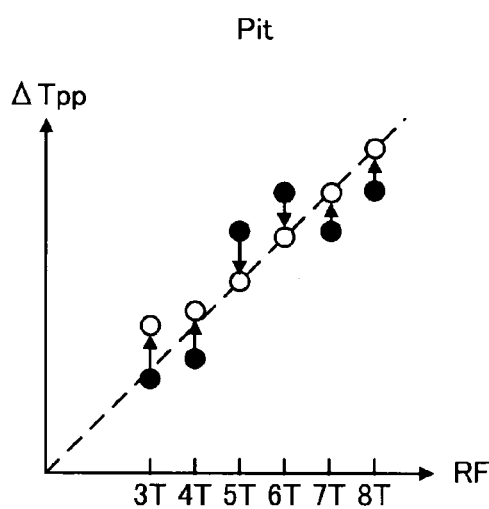
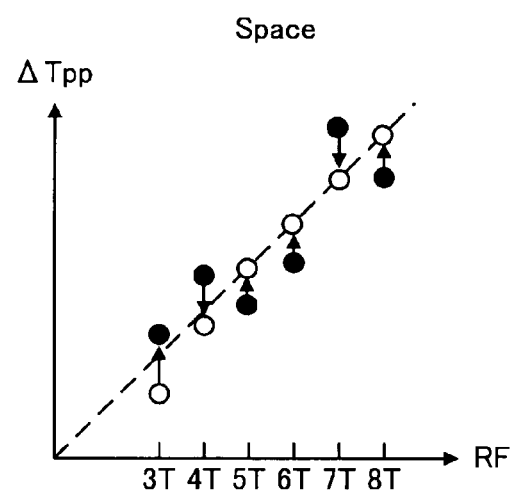

FIG. 29

| DETECTION ITEM | DETECTION PATTERN | RF LENGTH | ΔTpp |
|---|---|---|---|
| FRONT PHASE SHIFT | 3T | a01 | b01 |
| | 4T | a02 | b02 |
| | 5T | a03 | b03 |
| | 6T | a04 | b04 |
| | 7T | a05 | b05 |
| REAR PHASE SHIFT | 3T | a06 | b06 |
| | 4T | a07 | b07 |
| | 5T | a08 | b08 |
| | 6T | a09 | b09 |
| | 7T | a10 | b10 |
| THERMAL INTERFERENCE | 3T | a11 | b11 |
| | 4T | a12 | b12 |
| | 5T | a13 | b13 |
| | 6T | a14 | b14 |
| | 7T | a15 | b15 |

FIG. 30

| DETECTION ITEM | DETECTION PATTERN | ΔTpp | DIFFERENCE IN INNER TRACK |
|---|---|---|---|
| FRONT PHASE SHIFT | 3T | c01 | d01 |
| | 4T | c02 | d02 |
| | 5T | c03 | d03 |
| | 6T | c04 | d04 |
| | 7T | c05 | d05 |
| REAR PHASE SHIFT | 3T | c06 | d06 |
| | 4T | c07 | d07 |
| | 5T | c08 | d08 |
| | 6T | c09 | d09 |
| | 7T | c10 | d10 |
| THERMAL INTERFERENCE | 3T | c11 | d11 |
| | 4T | c12 | d12 |
| | 5T | c13 | d13 |
| | 6T | c14 | d14 |
| | 7T | c15 | d15 |

FIG. 38

| Code | Vav |
|------|---------|
| 2T | A01-A02 |
| 3T | B01-B02 |
| 4T | C01-C02 |
| 5T | D01-D02 |
| 6T | E01-E02 |
| 7T | F01-F02 |
| 8T | G01-G02 |
| 9T | H01-H02 |
| 10T | I01-I02 |
| 11T | J01-J02 |

OPTICAL INFORMATION RECORDING APPARATUS, OPTICAL INFORMATION RECORDING METHOD, AND SIGNAL PROCESSING CIRCUIT

BACKGROUND OF THE INVENTION

1. Field of the Invention

The present invention relates to an optical information recording apparatus, an optical information recording method, and a signal processing circuit and, in particular, to an optical information recording apparatus, an optical information recording method, and a signal processing circuit for effectively optimizing a recording condition for a medium having different recording characteristics in the inner and outer peripheries thereof.

2. Description of the Related Technology

The level of compatibility between optical information recording mediums including a CD-R (compact disc-recordable) and DVD-R (digital versatile disk-recordable) (hereinafter simply referred to as a "medium") and a recording apparatus (hereinafter referred to as a "drive") varies depending on different combinations thereof. This may be caused by a factor of the medium in that the optimum recording condition varies depending on the type of recording material of the medium and variation in a formed layer at assembly time and a factor of the drive in that the optimum recording condition varies depending on the types of a pickup and a semiconductor laser of the drive and part-to-part variation in assembly at fabrication time. In fact, an optimum recording condition for each combination of a medium and a drive is determined by any combination of the above-described factors.

Accordingly, a method is proposed in which a medium stores identification (ID) information for a drive to identify the type of the medium and a drive stores recording parameters prepared for each type of the medium in advance. When recording information on the medium, the drive reads the ID information from the medium loaded on the drive and uses the recording parameters (also referred to as a "writing strategy") associated with the ID information.

According to this method, substantially optimum recording parameters can be selected for a known medium that is verified in advance. However, there is a possibility that the stored recording parameters cannot support an unknown medium that is not verified in advance. Additionally, even for a medium that is verified in advance, when a recording environment (e.g., a recording speed, a disturbance, or deterioration with age) changes, the stored recording parameters cannot always support the medium.

A method for supporting an unknown medium is disclosed in, for example, Japanese Unexamined Patent Application Publication No. 2003-30837 and Japanese Unexamined Patent Application Publication No. 2004-110995. Paragraph 0020 of Japanese Unexamined Patent Application Publication No. 2003-30837 includes a statement that " . . . A phase error between the signal and a channel clock is detected for each recording pattern. A recording compensation parameter controller 12 optimizes the laser emission waveform rule on the basis of the detection result from a phase error detection unit 11 . . . ". That is, a method is disclosed that detects a phase error and corrects the phase error by comparison with a channel clock.

In addition, paragraph 0024 of Japanese Unexamined Patent Application Publication No. 2003-30837 includes a statement that " . . . Subsequently, a test pattern for determining the laser emission waveform rule is recorded. The area in which the test pattern is recorded is then played back and a relationship between a prepared laser emission waveform rule and an amount of the phase error is examined. That is, an amount of the phase error for each combination of the length of a mark and the length of a space immediately before the mark is measured. A laser emission waveform rule that causes the amount of the phase error to be zero is estimated on the basis of the measured amount of the phase error to determine a desired laser emission waveform rule . . . ". That is, a method is disclosed that measures an amount of the phase error for each combination of a mark and a space to estimate a laser emission waveform rule that causes the amount of the phase error to be zero (refer to FIGS. 8 and 12).

According to the method described in Japanese Unexamined Patent Application Publication No. 2003-30837, correction is carried out on the basis of the phase error of a recording pattern. Accordingly, this method is effective for optimizing a strategy.

However, according to the method described in Japanese Unexamined Patent Application Publication No. 2003-30837, like a known method, only a strategy prestored in a drive is finely tuned. Accordingly, it is difficult to obtain superior recording quality from a medium that is not adaptable to the prestored strategy.

Additionally, paragraph 0045 of Japanese Unexamined Patent Application Publication No. 2004-110995 includes a statement that " . . . A top pulse corresponding to 3T period and a non-multi pulse corresponding to 8T period are integrally (continuously) generated . . . ". Furthermore, paragraph 0046 of Japanese Unexamined Patent Application Publication No. 2004-110995 includes a statement that " . . . The laser power of the light pulse is controlled in two stages. When a ratio of laser power (crest value of the top pulse) Ph to laser power (crest value of the non-multi pulse) Pm is optimal, the optimum power is obtained . . . ". This statement suggests that optimizing the ratio of Ph/Pm is effective for increasing the compatibility.

However, according to the method described in Japanese Unexamined Patent Application Publication No. 2004-110995, as described in paragraph 0067 of Japanese Unexamined Patent Application Publication No. 2004-110995, initial values of Ph and Pm are temporarily set, and subsequently, the ratio of Ph/Pm is determined. Accordingly, as in Japanese Unexamined Patent Application Publication No. 2003-30837, it is difficult to obtain superior recording quality from a medium that is not adaptable to the temporary setting values.

Additionally, information is recorded on an optical information recording medium, such as an optical disk, by modulating data to be recorded with an 8-14 modulation (EFM) method or an 8-16 modulation method, generating recording pulses on the basis of the modulation signal, controlling the laser beam intensity and laser beam emission timing on the basis of the recording pulses, and forming recording pits on the optical disk.

Since the recording pits are formed by using thermal heat generated by laser irradiation, the recording pulses need to be set while taking into consideration a thermal storage effect and thermal interference. Accordingly, in the known drives, various parameters for setting the recording pulses are determined for each type of an optical disk in the form of a strategy. To record information on an optical disk, an optimum strategy for a recording environment is selected from among a plurality of the strategies.

The strategy depends on not only individual variability in an optical information recording apparatus, such as variation in a spot diameter of a pickup and variation in precision of a mechanism, but also on a manufacturer of an optical disk used for recording and playback and a recording speed. Therefore, setting an optimum strategy increases the recording quality.

Thus, a technique has been proposed in which the optimum strategy for an optical disk of each manufacturer is determined and prestored in a memory. When recording information on an optical disk, the name of the manufacturer recorded on the optical disk is read out of the memory to use the optimum strategy corresponding to the readout name of the manufacturer.

However, according to this technique, optimum recording can be carried out for an optical disk whose manufacturer name is recorded in the memory, but not for an optical disk whose manufacturer name is not recorded in the memory. In addition, even for an optical disk whose manufacturer name is recorded in the memory, optimum recording cannot be carried out if the recording speed is different.

Accordingly, test recording is carried out for each recording condition in advance, as discussed in Japanese Unexamined Patent Application Publications No. 5-144001, 4-137224, 5-143999, and 7-235056. An optimum strategy is then determined on the basis of the test recording so as to support a variety of types of optical disk. However, according to the technique discussed in Japanese Unexamined Patent Application Publications No. 5-144001, 4-137224, 5-143999, and 7-235056, test recording is required before starting to record information, and therefore, the strategy cannot be corrected simultaneously with the information recording. Accordingly, it is difficult for this technique to correct the strategy if the optimum condition for the inner periphery is different from that for the outer periphery.

To solve this problem, that is, the problem that the recording quality differs at the inner and outer peripheries because the recording characteristics of an optical disk slightly vary from the inner to outer peripheries and some recording units have different recording speeds at the inner and outer peripheries, Japanese Unexamined Patent Application Publication No. 53-050707 discloses a technique that reduces the difference in the recording quality between the inner and outer peripheries by controlling the output of the laser. Japanese Unexamined Patent Application Publication No. 53-050707 discloses a technique that automatically optimizes the output of laser by detecting the change in the intensity of an auxiliary beam. This technique is referred to as an "OPC".

The above-described OPC is a technique called a running OPC that controls the power in real time. Since the running OPC can determine correction conditions using a statistical index, such as an asymmetry value, real-time correction in which the correction is carried out during recording can be provided. To correct a pulse width and a pulse phase condition, an amount of shift between a recording pulse and a pit formed on an optical disk needs to be detected. However, it is difficult for the known OPC to detect the amount of shift.

Accordingly, to correct the pulse conditions in real time, a technology that detects the positions and lengths of a pit and a space during recording is required. As one of approaches to provide this technology, Japanese Unexamined Patent Application Publication No. 51-109851 discloses a technology that plays back the location that is substantially the same as the recorded location. However, although this technology is applicable to magnetooptical recording, it is difficult to apply this technology to optical recording that does not use magnetic recording. That is, since, in magnetooptical recording, information is recorded using magnetic modulation, the output of laser is not modulated. In contrast, since, in optical recording, information is recorded using laser output modulation, the laser output modulation disadvantageously affects the playback of the information.

The following Patent Documents disclose technologies to solve this problem: Japanese Unexamined Patent Application Publications No. 1-287825, 7-129956, 2004-22044, and 9-147361. According to Japanese Unexamined Patent Application Publication No. 1-287825, different beams are emitted to an unrecorded area and a recorded area to obtained first and second signals. The playback signal is generated by dividing the second signal by the first signal. This technology can correct the distortion of the waveform of the playback signal caused by the laser beam intensity modulation during recording.

According to Japanese Unexamined Patent Application Publication No. 7-129956, a playback signal is obtained while canceling the modulated output by the laser output appropriately amplified by an auto gain control (AGC) using the reversed phase clock.

According to Japanese Unexamined Patent Application Publication No. 2004-22044, the distortion of a playback signal due to the variation of a waveform of a recording pulse is canceled by a signal which corresponds to the variation of a waveform of a recording pulse and which is generated by a delay inversion equivalent circuit.

In the technologies discussed in Japanese Unexamined Patent Application Publications No. 1-287825, 7-129956, and 2004-22044, a modulated component is canceled by computation. Theoretically, the modulated component can be canceled. However, various problems remain for a practical application in terms of the precision of the cancellation and the computing speed.

According to Japanese Unexamined Patent Application Publication No. 9-147361, the shift occurring during recording is detected in real time by inputting a pulse delayed from a pulse used for recording and a gate signal inverted from a modulated signal into a phase comparator together with a playback pulse.

However, in the technique discussed in Japanese Unexamined Patent Application Publication No. 9-147361, since a pit is played back when a recording pulse is off, it is difficult to obtain a playback signal of sufficient quality when the output level of a sub beam is low. In particular, in a configuration that generates a sub beam for playback by dividing a main beam for recording, it is difficult to allocate sufficient power to the sub beam when the branch ratio is, for example, 20:1 or 30:1.

That is, according to Japanese Unexamined Patent Application Publication No. 9-147361, the branch ratio is 8:1. However, as the recording speed increases, the branch ratio tends to increase. Additionally, in general, the output power of a beam is less than or equal to 1 mW when a recording pulse is turned off. Accordingly, the detected intensity of reflected beam from the recording surface becomes very small when a recording pulse is turned off. If the detected intensity of the beam becomes very small, the beam is easily affected by circuit noise and medium noise, and therefore, a superior detection signal cannot be obtained.

In contrast, to detect the lengths of a pit and a space recorded on an optical disk, the following methods are known: an integration detection method using an integration value of a playback RF signal, an amplitude detection method using a first derivative value of an RF signal, and a peak detection method using a second derivative value of an RF signal.

However, in an optical recording apparatus that carries out a playback operation using a laser beam of a relatively short wavelength, since the interference between a spot and a pit does not occur for an optical medium recorded in low density, it is difficult to detect length information using the integration detection method for the RF signal.

According to the method using a first derivative value of an RF signal, if the recording power varies with the variation of a recording speed, signals digitized in the same slice level are recognized as different lengths even when pits or spaces of the same lengths are detected. To solve this problem, the slice level may be changed in accordance with a recording speed. However, it is difficult to set an appropriate slice level for each recording speed.

For example, International Publication No. WO96/24130 discloses the peak detection method using a second derivative value of an RF signal. In the method disclosed in International Publication No. WO96/24130, by differentiating a difference signal of a light detector having two areas divided by a dividing line optically perpendicular to the rotational direction of an optical medium, that is, by differentiating a tangential push-pull signal, a signal equivalent to a second derivative of an RF signal is generated. By using this signal, the edge position of a pit can be detected.

However, when a pit and a space recorded on an optical density type optical medium (e.g., a medium of a DVD class) are detected using the method disclosed in International Publication No. WO96/24130, an error occurs in a derivative value of a tangential push-pull signal from a short pit of 3T or 4T that easily causes interference. Thus, a value different from the proper value is detected.

Additionally, Japanese Unexamined Patent Application Publication No. 2002-117544 discloses a method that is an improvement of the above-described running OPC. In Japanese Unexamined Patent Application Publication No. 2002-117544, a method for detecting the optimum power using a specific pit land pattern is disclosed. However, according to the pit land pattern discussed in Japanese Unexamined Patent Application Publication No. 2002-117544, the power cannot be distinguished from an adjustment element of a pulse width, and therefore, a margin for providing the sufficient recording quality cannot be obtained. As a result, it is difficult to support high-speed recording.

SUMMARY OF THE INVENTION

Accordingly, the present invention provides an optimizing method of recording conditions for a medium whose recording characteristic varies at the inner and outer peripheries.

According to an embodiment of the present invention, an optical information recording apparatus forms a pit and a space on an optical recording medium by emitting a recording laser beam on the basis of a recording pulse having at least two output zones of a high output zone and a low output zone and concurrently detects the pit and space by emitting a playback laser beam. The optical information recording apparatus includes retrieval means for retrieving a portion of a playback signal obtained in the high output zone of the recording laser beam from the playback signal obtained by emitting the playback laser beam, average value detection means for detecting an average value of the retrieved playback signal, peak value detection means for detecting a peak value of the retrieved playback signal, and adjustment means for adjusting the power of the recording laser beam using the average value and the peak value.

By utilizing the average value of the playback signal, even for a playback signal on which continuous on/off signals of a recording pulse are overlaid, a DC-like reference level can be set. Accordingly, a β value or an index, such as an asymmetry value, can be obtained from a playback signal detected in real time during recording. The types of the playback signal may include an RF signal, a tangential push-pull signal, and a derivative signal of the tangential push-pull signal. The peak value of the playback signal includes a maximum value and a minimum value of the retrieved playback signal.

As used herein, the high output zone means a zone in which the recording pulse is on. The low output zone means a zone in which the recording pulse is off.

By detecting the average value in the high output zone of the recording laser beam, sufficient output of the playback laser beam can be provided even when the playback laser beam is generated by dividing the recording laser beam. In particular, this method is effective when the branch ratio of the recording laser beam to the playback laser beam is high, and therefore, it is difficult to provide sufficient power to the playback laser beam.

That is, while a pit is being recorded, a laser beam having intensity higher than that of a normal playback beam is output. Therefore, by selectively retrieving the high output condition and retrieving the playback signal, relatively low noise playback signal can be precisely detected.

By correcting the recording condition in real time on the basis of this detected playback signal, the optical information recording apparatus can process the difference between the inner periphery and the outer periphery. It should be noted that the recording laser beam and the playback laser beam may be output from different light sources or may be output by dividing a single laser beam from a single light source. When the divided laser beams are used, the single laser beam includes a laser beam obtained by further dividing the single beam from a specific light source several times. That is, the recording laser beam and the playback laser beam may be generated from a laser beam via intermediate dividing steps.

Preferably, the peak value is detected as a top peak value and a bottom peak value of the amplitude of the playback signal. After a difference between an upper maximum peak value and the average value and a difference between a lower maximum peak value and the average value are obtained, a β equivalent value is computed using these difference values. The β equivalent value is preferably computed using the following equation: β equivalent value={(maximum peak value−average value)−(average value−minimum peak value)}/{(maximum peak value−average value)+(average value−minimum peak value)}.

Additionally, the high output zone can include a constant output zone in which the level of the recording pulse remains constant, and the playback signal can be retrieved while the recording laser beam is being emitted in the constant output zone.

Here, the constant output zone refers to a stable zone with a little modulation of the recording pulse being on. Preferably, the constant output zone is a zone in which an unmodulated state continues for a predetermined period of time. More specifically, the constant output zone can be a high output zone 14T or 11T of the recording pulse.

As described above, by obtaining an average value in the constant output zone of the recording pulse, the effect of modulation can be eliminated. That is, even when the same light source is used for recording and playback operations, a playback signal can be detected on the basis of a laser beam having a high and stable output by selectively using an unmodulated stable zone of the recording pulse without an abrupt change. As a result, a high-precision average value of the signal can be obtained.

According to another embodiment of the present invention, an optical information recording apparatus sets a recording pulse including at least two output zones of a high output zone and a low output zone in association with each of a plurality of types of code, forms a pit and a space on an optical recording medium by emitting a recording laser beam on the basis of the recording pulse, and concurrently detects the pit and space by emitting a playback laser beam. The optical information recording apparatus includes retrieval means for retrieving a portion of a playback signal obtained in the high output zone of the recording laser beam from the playback signal obtained by emitting the playback laser beam, average value detection means for detecting an average value of the retrieved playback signal, and code type determination means for determining the type of code on the basis of the average value.

By determining the type of code on the basis of the average value of the playback signal, code information can be obtained without using a complicated process, such as the partial response and maximum likelihood (PRML) algorithm or the Viterbi algorithm.

According to an embodiment of the present invention, an optical information recording apparatus sets a recording pulse including at least two output zones of a high output zone and a low output zone in association with each of a plurality of types of code, forms a pit and a space on an optical recording medium by emitting a recording laser beam on the basis of the recording pulse, and concurrently detects the pit and space by emitting a playback laser beam. The optical information recording apparatus includes retrieval means for retrieving a portion of a playback signal obtained in the high output zone of the recording laser beam from the playback signal obtained by emitting the playback laser beam, average value detection means for detecting an average value of the retrieved playback signal, and code type determination means for determining the type of code on the basis of the average value. The optical information recording apparatus can further include detection means for detecting a shift amount of at least one of the formed pit and the formed space on the basis of the average value.

As described above, by determining the type of code on the basis of the average value of the playback signal, code information can be obtained without using a complicated process, such as the partial response and maximum likelihood (PRML) algorithm or the Viterbi algorithm.

According to still another embodiment of the present invention, an optical information recording method is used to form a pit and a space on an optical recording medium by emitting a recording laser beam on the basis of a recording pulse having at least two output zones of a high output zone and a low output zone and concurrently detect the pit and space by emitting a playback laser beam. The method includes the steps of retrieving a portion of a playback signal obtained in the high output zone of the recording laser beam from the playback signal obtained by emitting the playback laser beam, detecting an average value and a peak value of the retrieved playback signal, and adjusting the power of the recording laser beam using the detected average value and the peak value.

According to an embodiment of the present invention, an optical information recording method is used to form a pit and a space on an optical recording medium by emitting a recording laser beam on the basis of a recording pulse having at least two output zones of a high output zone and a low output zone and concurrently detect the pit and space by emitting a playback laser beam. The method includes the steps of retrieving a portion of a playback signal obtained in the high output zone of the recording laser beam from the playback signal obtained by emitting the playback laser beam, detecting an average value, a top value, and a bottom value of the playback signal, and determining the type of a code on the basis of the detected average value, top value, and bottom value.

According to an embodiment of the present invention, an optical information recording method is used to form a pit and a space on an optical recording medium by emitting a recording laser beam on the basis of a recording pulse having at least two output zones of a high output zone and a low output zone and concurrently detect the pit and space by emitting a playback laser beam. The method includes the steps of retrieving a portion of a playback signal obtained in the high output zone of the recording laser beam from the playback signal obtained by emitting the playback laser beam, detecting an average value of the retrieved playback signal, and detecting a shift amount of at least one of the formed pit and the formed space on the basis of the detected average value.

According to still another embodiment of the present invention, a signal processing circuit is incorporated in an optical information recording apparatus for forming a pit and a space on an optical recording medium by emitting a recording laser beam on the basis of a recording pulse having at least two output zones of a high output zone and a low output zone and for concurrently detecting the pit and space by emitting a playback laser beam. The signal processing circuit includes retrieval means for retrieving a portion of a playback signal obtained in the high output zone of the recording laser beam from the playback signal obtained by emitting the playback laser beam, average value detection means for detecting an average value of the retrieved playback signal, peak value detection means for detecting a peak value of the retrieved playback signal, and adjustment means for adjusting the power of the recording laser beam using the average value and the peak value.

According to still another embodiment of the present invention, a signal processing circuit is incorporated in an optical information recording apparatus for setting a recording pulse having at least two output zones of a high output zone and low output zone in accordance with a plurality of types of code, the optical information recording apparatus forming a pit and a space on an optical recording medium by emitting a recording laser beam on the basis of the recording pulse and concurrently detecting the pit and space by emitting a playback laser beam. The signal processing circuit includes retrieval means for retrieving a portion of a playback signal obtained in the high output zone of the recording laser beam from the playback signal obtained by emitting the playback laser beam, average value detection means for detecting an average value of the retrieved playback signal, and code type determination means for determining the type of a code on the basis of the average value.

According to an embodiment of the present invention, a signal processing circuit is incorporated in an optical information recording apparatus for setting a recording pulse having at least two output zones of a high output zone and low output zone in accordance with a plurality of types of code, the optical information recording apparatus forming a pit and a space on an optical recording medium by emitting a recording laser beam on the basis of the recording pulse and concurrently detecting the pit and space by emitting a playback laser beam. The signal processing circuit includes retrieval means for retrieving a portion of a playback signal obtained in the high output zone of the recording laser beam from the playback signal obtained by emitting the playback laser beam, average value detection means for detecting an average value of the retrieved playback signal, and shift amount detection means for detecting a shift amount of at least one of the formed pit and the formed space on the basis of the average value.

According to still another embodiment of the present invention, an optical information recording apparatus forms a pit and a space on an optical recording medium by emitting a recording laser beam on the basis of a recording pulse having at least two output zones of a high output zone and a low output zone and concurrently detects the pit and space by emitting a playback laser beam. The optical information recording apparatus includes β value detection means for detecting a β value using the recording laser beam, retrieval means for retrieving a portion of a playback signal obtained in the high output zone of the recording laser beam from the playback signal obtained by emitting the playback laser beam, average value detection means for detecting an average value of the retrieved playback signal, peak value detection means for detecting a peak value of the retrieved playback signal, β-equivalent value detection means for detecting a β equivalent value using the average value and the peak value, difference detection means for detecting a difference between the β value and the β equivalent value, and correction means for correcting the β equivalent value using the detected difference.

By correcting the difference between the β value detected using the recording laser beam and the β equivalent value detected using the playback laser beam, more precise and more optimum power correction can be carried out. That is, when the diameter of a spot of the recording laser beam is different from that of the playback laser beam, the β value detected using the recording laser beam is offset from that detected using the playback laser beam. Accordingly, the optimum β value is predetermined using the recording laser beam and a test area. Subsequently, correlation between the optimum β value and the β equivalent value detected using the playback laser beam is obtained. The β equivalent value can be corrected by using this correlation as an offset correction value.

According to still another embodiment of the present invention, an optical information recording method is used to form a pit and a space on an optical recording medium by emitting a recording laser beam on the basis of a recording pulse having at least two output zones of a high output zone and a low output zone and concurrently detect the pit and space by emitting a playback laser beam. The method includes the steps of detecting a β value using the recording laser beam, retrieving a portion of a playback signal obtained in the high output zone of the recording laser beam from the playback signal obtained by emitting the playback laser beam, detecting an average value of the retrieved playback signal, detecting a peak value of the retrieved playback signal, detecting a β equivalent value using the average value and the peak value, detecting a difference between the β value and the β equivalent value, and correcting the β equivalent value using the detected difference.

According to still another embodiment of the present invention, a signal processing circuit is incorporated in an optical information recording apparatus for forming a pit and a space on an optical recording medium by emitting a recording laser beam on the basis of a recording pulse having at least two output zones of a high output zone and a low output zone and for concurrently detecting the pit and space by emitting a playback laser beam. The signal processing circuit includes β-value detection means for detecting a β value using the recording laser beam, retrieval means for retrieving a portion of a playback signal obtained in the high output zone of the recording laser beam from the playback signal obtained by emitting the playback laser beam, average value detection means for detecting an average value of the retrieved playback signal, peak value detection means for detecting a peak value of the retrieved playback signal, β-equivalent value detection means for detecting a β equivalent value using the average value and the peak value, difference detection means for detecting a difference between the β value and the β equivalent value, and correction means for correcting the β equivalent value using the detected difference.

As stated above, according to the present invention, since a recording condition can be optimized in real time for a medium having a different in the recording property between the inner and outer peripheries, the margin for the recording quality can be improved.

BRIEF DESCRIPTION OF THE DRAWINGS

FIGS. 7A-E are timing diagrams schematically illustrating the generation of a gate signal shown in FIG. 6;

FIG. 11 is a diagram schematically illustrating a generation method of a flag signal carried out by a CPU shown in FIG. 1;

FIGS. 19A-G are timing diagrams illustrating an exemplary process of a circuit block shown in FIG. 18;

FIGS. 20A-D are diagrams schematically illustrating a determination criterion of the determination signal generated by the circuit block shown in FIG. 18;

FIGS. 22A-E are timing diagrams illustrating an exemplary process of a circuit block shown in FIG. 21;

FIGS. 23A-D are timing diagrams illustrating an exemplary process of a reset pulse generation circuit 426 shown in FIG. 21;

FIGS. 25A-C are first timing diagrams illustrating the operation of the circuit shown in FIG. 24;

FIGS. 26A-D are second timing diagrams illustrating the operation of the circuit shown in FIG. 24;

FIGS. 28A and 28B are graphs illustrating a relationship between the derivative values of tangential push-pull signals about a pit and a space obtained from the recording area and the derivative values of tangential push-pull signals about a pit and a space obtained from the test area;

FIG. 29 is a diagram schematically illustrating an example of test recording for obtaining the derivative value of a tangential push-pull signal in the test area;

FIG. 30 is a diagram schematically illustrating an example of test recording for obtaining the derivative value of a tangential push-pull signal in a recording area;

FIG. 38 schematically illustrates the structure of a data table 722 shown in FIG. 37.

DESCRIPTION OF THE PREFERRED EMBODIMENTS

An exemplary embodiment is now herein described with reference to the accompanying drawings. However, it will be understood that it is not intended to limit the invention to that embodiment. On the contrary, it is intended to cover all alternatives, modifications and equivalents as may be included within the spirit and scope of the invention as defined by the appended claims.

Figure 1:
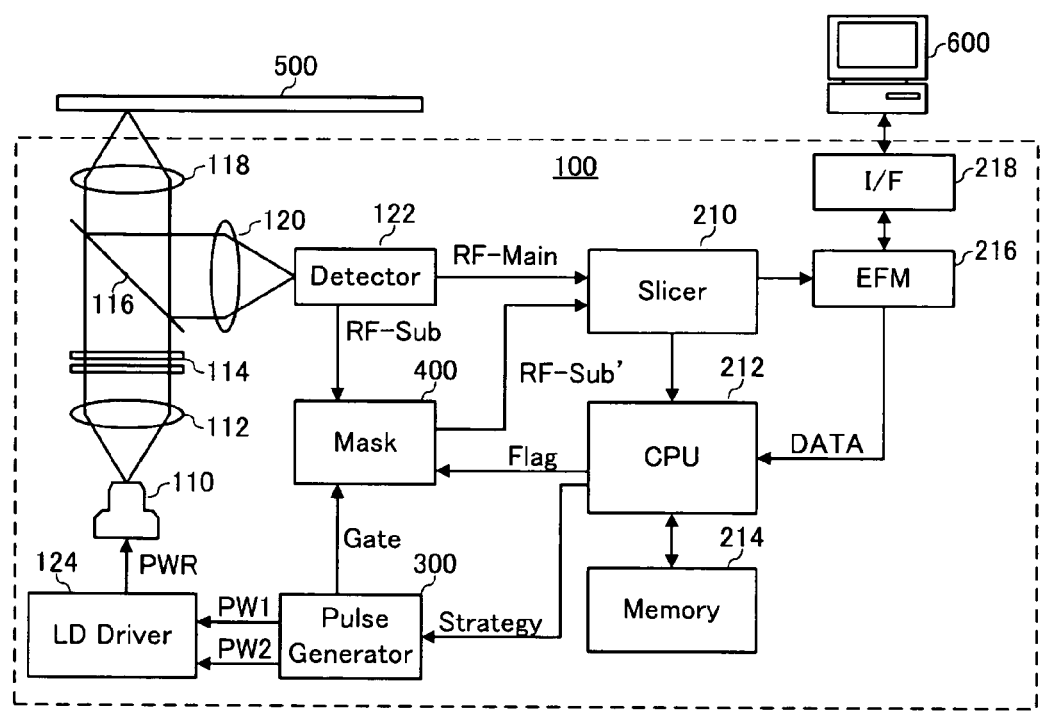
FIG. 1 is a block diagram of the internal configuration of a drive according to an embodiment of the present invention.

FIG. 1 is a block diagram of the internal configuration of a drive according to an embodiment of the present invention. As shown in FIG. 1, a drive 100 records and plays back information on and from an optical disk 500 using a laser beam emitted from a laser diode 110. The drive 100 also receives and transmits data from and to an external unit, such as a personal computer 600.

When recording information on the optical disk 500, an EFM encoder/decoder 216 of the drive 100 encodes recording data received from the personal computer 600 via an interface circuit 218. A central processing unit (CPU) 212 processes the encoded recording data to determine a strategy serving as a recording condition for the optical disk 500. A pulse generation circuit 300 then converts the strategy to a recording pulse and outputs the recording pulse to an LD driver 124.

The LD driver 124 drives the laser diode 110 on the basis of the input recording pulse. The laser diode 110 controls the output laser beam in response to the recording pulse and emits the controlled laser beam onto the optical disk 500 rotating at a constant linear speed or at a constant rotational speed via a collimator lens 112, a diffraction grating 114, a half mirror 116, and an objective lens 118. Thus, a recording pattern formed from a pit and space line corresponding to desired recording data is recorded on the optical disk 500.

When information recorded on the optical disk 500 is played back, the laser diode 110 emits a playback laser beam onto the optical disk 500 via the collimator lens 112, the diffraction grating 114, the half mirror 116, and the objective lens 118.

At that time, the playback laser beam has a lower intensity than the laser beam used during recording. The playback laser beam reflected off the optical disk 500 is received by a detector 122 via the objective lens 118, the half mirror 116, and a light receiving lens 120. The reflected laser beam is then converted to an electrical signal.

The electrical signal output from the detector 122 corresponds to the recording pattern formed from pits and spaces recorded on the optical disk 500. This electrical signal is digitized by a slicer 210, is decoded by the EFM encoder/decoder 216, and is output as a playback signal.

Figure 2:
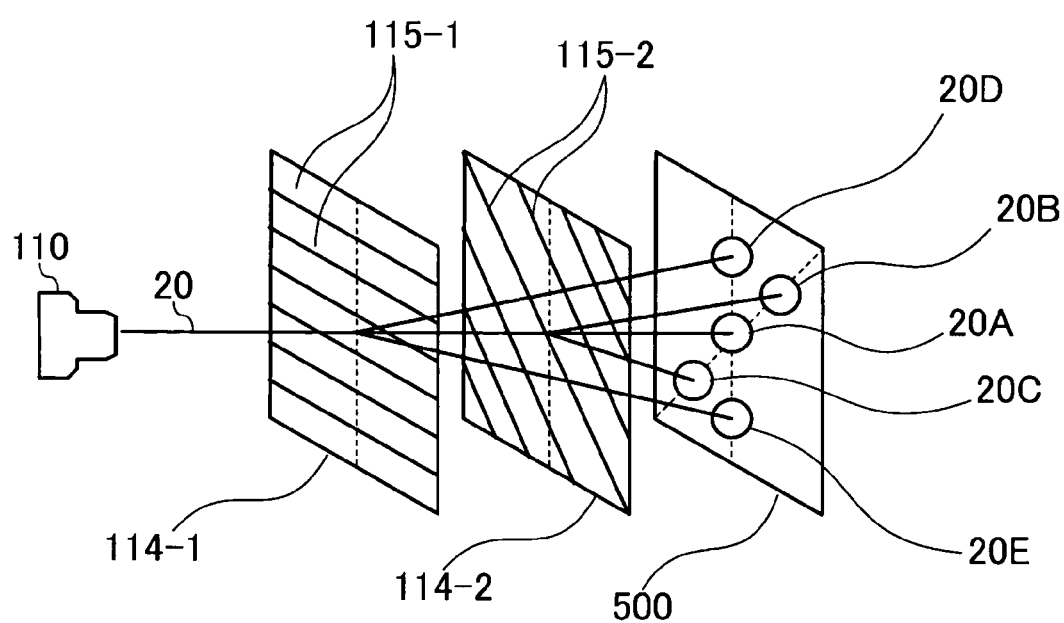
FIG. 2 is an exploded perspective view illustrating the structure of a pickup unit incorporated in the drive shown in FIG. 1.

FIG. 2 is an exploded perspective view illustrating the structure of a pickup unit incorporated in the drive shown in FIG. 1. As shown in FIG. 2, a diffraction grating disposed between the laser diode 110 and a surface of the optical disk 500 includes two diffraction gratings 114-1 and 114-2. The diffraction gratings 114-1 and 114-2 include grooves 115-1 and 115-2, respectively. The directions of the grooves 115-1 and 115-2 are different from each other.

When a laser beam 20 is incident on the diffraction grating having such a structure, the laser beam 20 is divided into three laser beams by the first diffraction grating 114-1. One of the three laser beams is further divided into three laser beams by the second diffraction grating 114-2, and therefore, five beams 20A-E are emitted onto the surface of the optical disk 500 to form five spots.

Figure 3:
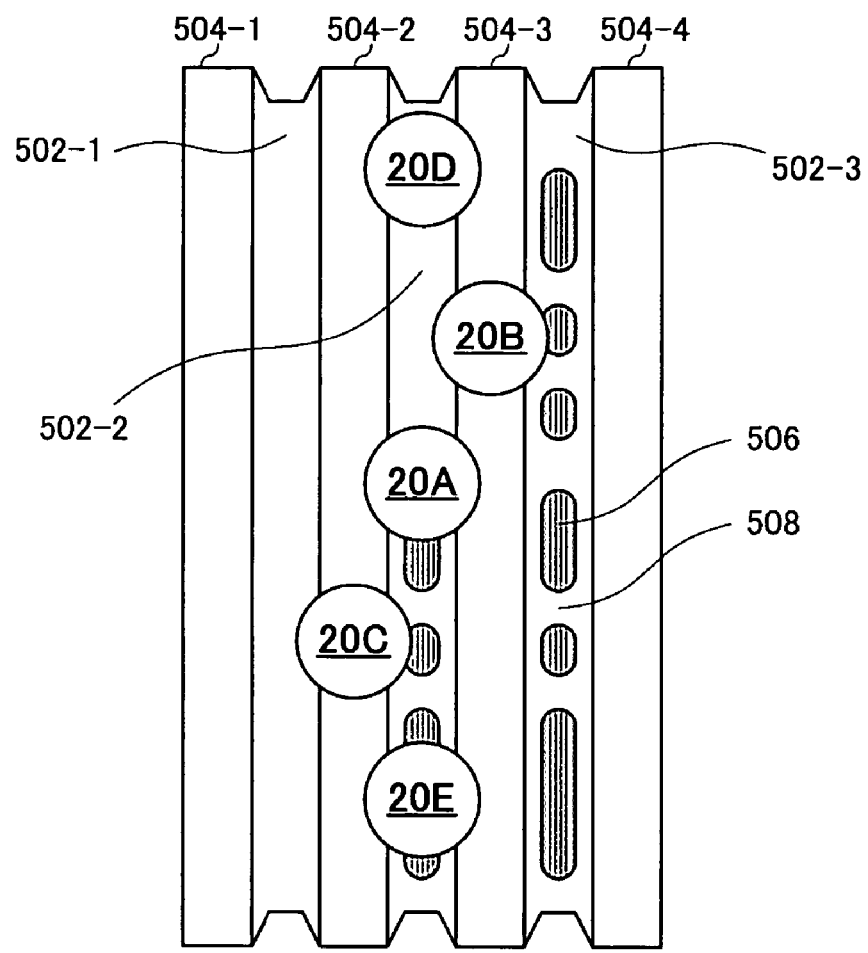
FIG. 3 is a plan view illustrating the locations of spots emitted onto a surface of an optical disk.

FIG. 3 is a plan view illustrating the locations of the spots emitted onto the surface of the optical disk. As shown in FIG. 3, the recording main beam 20A, the tracking leading sub beam 20B, the tracking following sub beam 20C, the playback leading sub beam 20D, and the playback following sub beam 20E are emitted onto the surface of the optical disk 500.

Here, the recording main beam 20A is emitted on a groove 502-2 formed on the optical disk 500. A beam spot of the recording main beam 20A forms a pit 506 in the groove 502-2. The recording main beam 20A has the highest intensity so as to allow a bit to be generated in a heat mode.

The tracking leading sub beam 20B is emitted onto a land 504-3 adjacent to the groove 502-2 on which the recording main beam 20A has been emitted, while the tracking following sub beam 20C is emitted onto a land 504-2, which is adjacent to the groove 502-2 and which is located on the side of the groove 502-2 remote from the land 504-3 on which the sub beam 20B has been emitted.

The playback leading sub beam 20D is emitted onto a location in the groove 502-2 before the location at which the recording main beam 20A is emitted, while the playback following sub beam 20E is emitted onto a location in the groove 502-2 after the location at which the recording main beam 20A is emitted.

These spots are arranged in this manner so that the recording pattern formed by the recording main beam 20A, namely, the recording pattern including a combination of the pit 506 and a space 508 can be detected by the playback following sub beam 20E.

Figure 4:
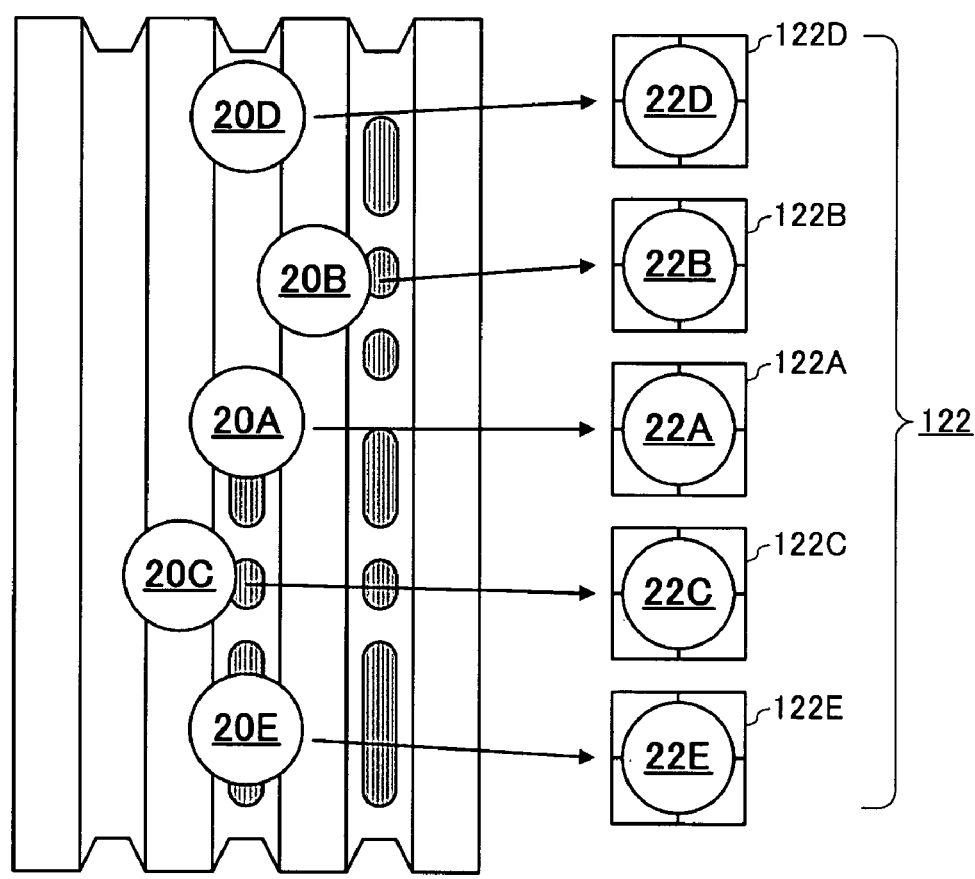
FIG. 4 is a diagram schematically illustrating a relationship between a spot emitted on a surface of an optical disk and a detector.

FIG. 4 is a diagram schematically illustrating a relationship between a spot emitted on a surface of an optical disk and a detector. As shown in FIG. 4, the detector 122 shown in FIG. 1 includes five light receiving units 122A-E. Reflected laser beams 22A-E of the laser beams (spots) 20A-E are emitted onto the light receiving units 122A-E, respectively. The reflected laser beams 20A-E are converted to electrical signals.

FIGS. 5A-E are diagrams schematically illustrating a relationship between the shape of a recording pulse and a stable zone. As shown in FIGS. 5A-E, a recording pulse output from the LD driver 124 shown in FIG. 1 has a variety of shapes, each of which includes a high output zone 50 representing the ON state of the recording pulse, a low output zone 52 representing the OFF state of the recording pulse, and a constant output zone 54 representing the ON state with little modulation.

Figure 5:
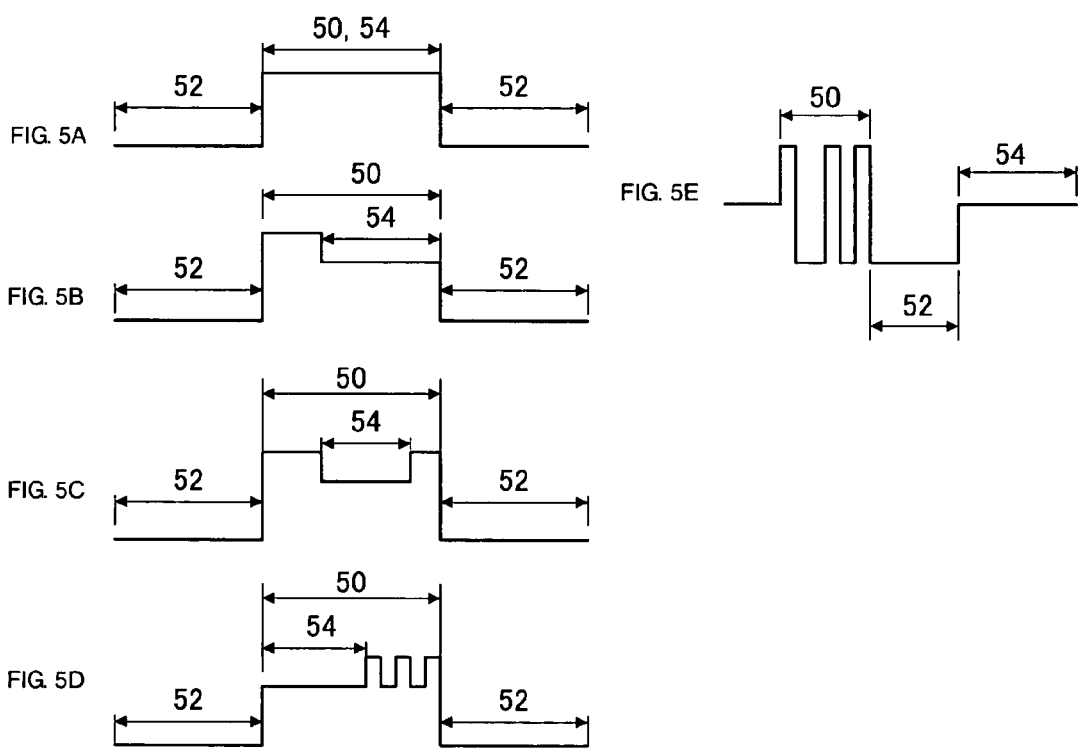
FIGS. 5A-E are diagrams schematically illustrating a relationship between the shape of a recording pulse and a stable zone.

More specifically, FIG. 5A illustrates a recording pulse in an ON mode with a constant output. FIG. 5B illustrates a recording pulse whose heights are different at the leading edge portion and the trailing edge portion. FIG. 5C illustrates a recording pulse whose heights are different at the leading edge portion, middle portion, and trailing edge portion. FIG. 5D illustrates a recording pulse having a constant output portion in the leading portion and the subsequent portion in which the output is changed several times.

According to one embodiment of the present invention, a playback signal is intended to be retrieved while the recording pulse is ON. Accordingly, a gate signal described below is preferably generated in synchronization with the high output zone 50. More preferably, the gate signal is generated in synchronization with the constant output zone 54 where the recording pulse is scarcely affected by the modulation. For the sake of simplicity, the constant output zone 54 is defined as the longest period in the high output zone 50 having a stable state. However, even if a stable zone is shorter than the longest period having a stable state, that stable zone may be defined as a constant output zone. Also, while the exemplary embodiment of the present invention is described hereinafter with reference to the shape of a pulse known as a castle type of a pulse shown in FIG. 5C, the present invention can be applied to another type of a recording pulse.

For example, when the present invention is applied to recording power used for a phase-change optical disk shown in FIGS. 5A-E, a recording pulse includes the high output zone 50 in which a phase change material is rapidly cooled by repeatedly applying high and low outputs and enters an amorphous (noncrystalline) state, the low output zone 52 in which a power of about 0.7 to 1 mW, to which servo can be effected, is output, and the constant output zone 54 in which the phase change material is slowly cooled and enters a crystalline state. A gate signal can be generated in synchronization with the constant output output zone 54 corresponding to erasing power so that a signal played back by the sub beam is retrieved during the constant output zone 54.

Figure 6:
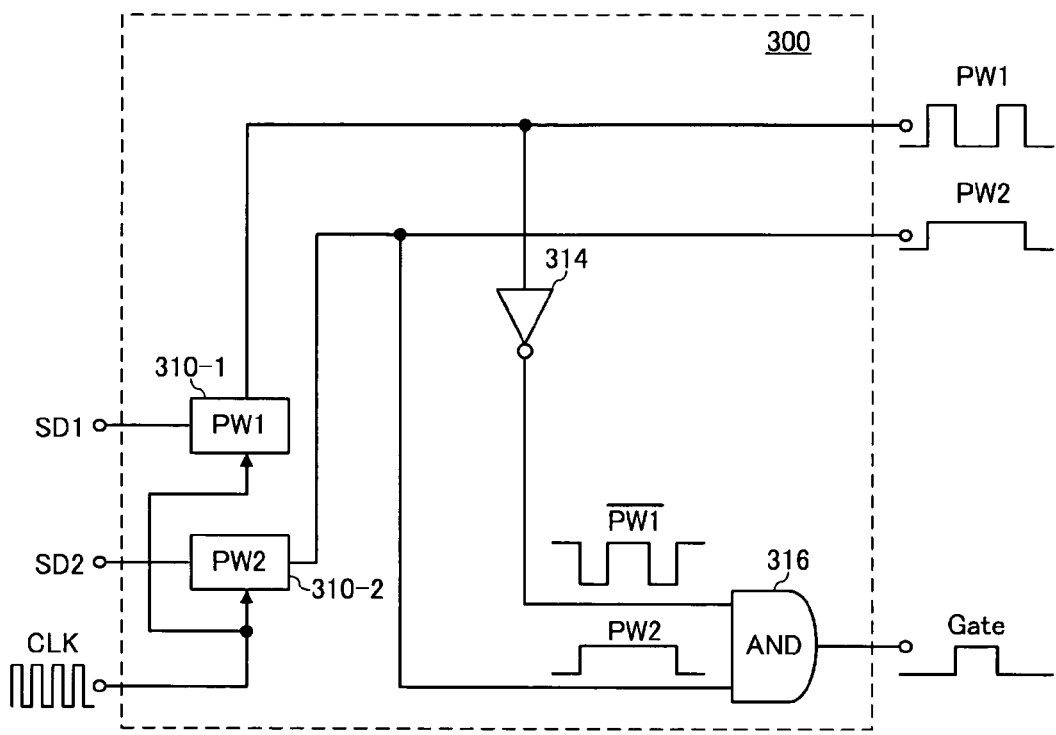
FIG. 6 is a block diagram illustrating the internal configuration of a pulse generation circuit shown in FIG. 1.

FIG. 6 is a block diagram illustrating the internal configuration of the pulse generation circuit shown in FIG. 1. As shown in FIG. 6, the pulse generation circuit 300 includes pulse unit generation circuits 310-1 and 310-2, which receive strategy conditions SD1 and SD2 delivered from the CPU 212 shown in FIG. 1 and which generate pulse signals PW1 and PW2 in synchronization with a clock signal CLK, respectively.

As used herein, the strategy conditions SD1 and SD2 are defined as numerical data indicating the length of ON and OFF periods of a pulse as the number of clocks. Upon receiving these data, the pulse unit generation circuits 310-1 and 310-2 generate pulse signals corresponding to the conditions indicated by the strategy conditions SD1 and SD2 using the clock signal CLK generated inside the drive.

These pulse signals PW1 and PW2 are output to the LD driver 124 shown in FIG. 1 Simultaneously, an AND arithmetic unit 316 carries out a logical multiplication of the inverted signal of the pulse signal PW1 and the pulse signal PW2. The result of the logical multiplication is output to a mask circuit 400 shown in FIG. 1 as a gate signal Gate. It is noted that the inverted signal of the pulse signal PW1 is generated by an inverting circuit 314.

FIGS. 7A-E are timing diagrams schematically illustrating the generation of the gate signal shown in FIG. 6. As shown in FIGS. 7A-E, the gate signal corresponding to the constant output zone of the recording pulse is generated using the pulse signals PW1 and PW2, which are components of the recording pulse. That is, as shown in FIGS. 7B and 7C, the pulse signals PW1 and PW2 are generated in synchronization with the clock signal CLK shown in FIG. 7A. The inverted signal shown in FIG. 7D is generated from the pulse signal PW1.

Subsequently, the levels of the pulse signal PW2 shown in FIG. 7C and the inverted signal shown in FIG. 7D are defined as in FIGS. 7C and 7D, and the logical multiplication of the pulse signal PW2 and the inverted signal is computed to obtain a gate signal as shown in FIG. 7E. As a result, the obtained gate signal corresponds to the constant output zone of the recording pulse.

Figure 8:
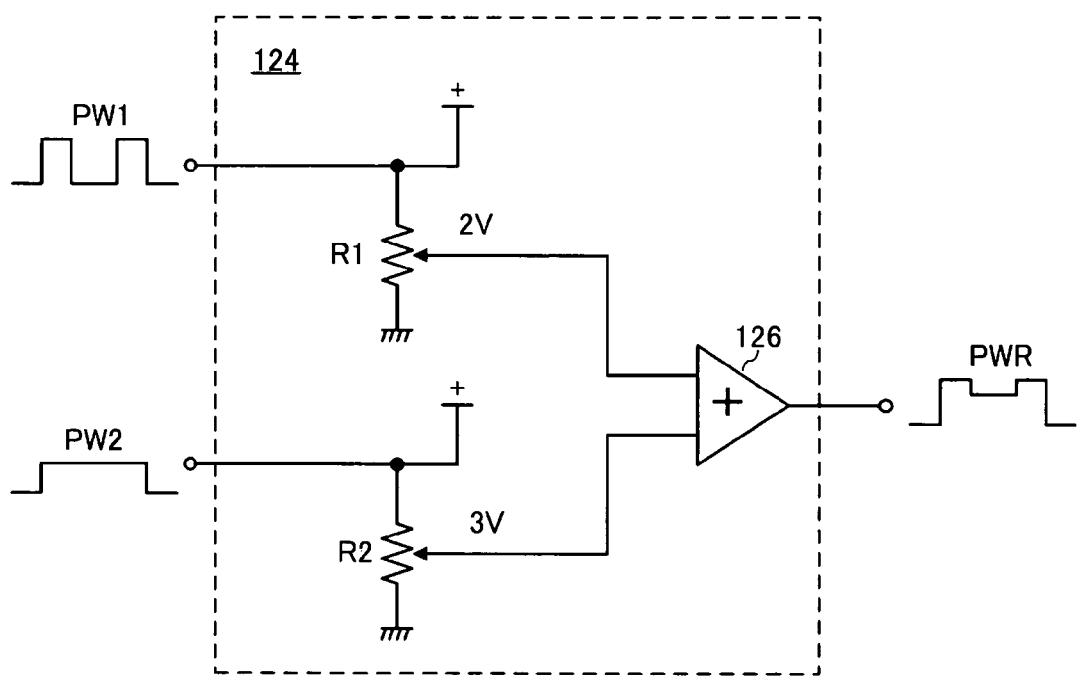
FIG. 8 is a circuit block diagram illustrating the internal configuration of an LD driver shown in FIG. 1.

FIG. 8 is a circuit diagram illustrating the internal configuration of the LD driver shown in FIG. 1. As shown in FIG. 8, the LD driver 124 includes a voltage divider circuit using resistors R1 and R2 and a compositor 126 for combining the divided voltages output from the resistors R1 and R2. The pulse signals PW1 and PW2 from the pulse generation circuit 300 are amplified to predetermined levels via the resistors R1 and R2. The amplified signals are combined by the compositor 126 to obtain a logical multiplication. Thus, a recording pulse PWR is generated. The recording pulse PWR is then output to the laser diode 110 shown in FIG. 1.

Figure 9:
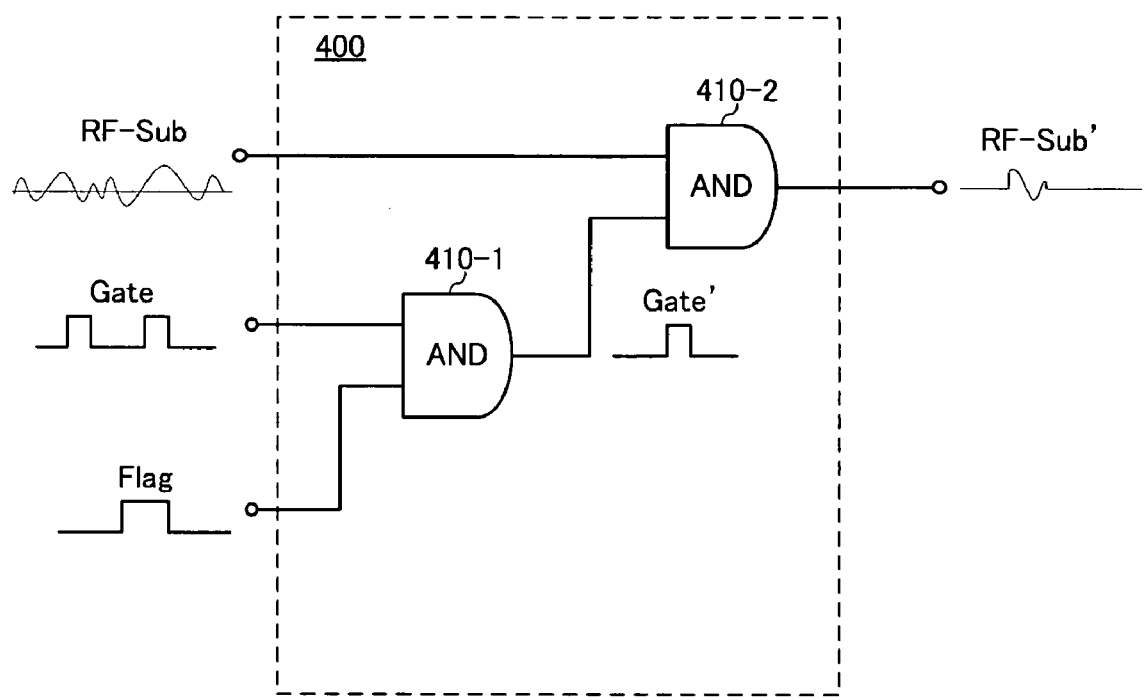
FIG. 9 is a block diagram illustrating the internal configuration of a mask circuit shown in FIG. 1.

FIG. 9 is a block diagram illustrating the internal configuration of the mask circuit shown in FIG. 1. As shown in FIG. 9, the mask circuit 400 includes two AND arithmetic units 410-1 and 410-2. The gate signal Gate generated by the pulse generation circuit 300 shown in FIG. 1 and a flag signal Flag generated by the CPU 212 are input to the AND arithmetic unit 410-1 of a first stage. These two signals are subject to a logical multiplication to generate a gate signal Gate', which is input to the AND arithmetic unit 410-2 of the subsequent stage.

Using this gate signal Gate', the AND arithmetic unit 410-2 masks an RF signal RF-Sub, which is a signal played back by the playback following sub beam 20E and which is output from the light receiving unit 122E shown in FIG. 4, to retrieve an RF signal RF-Sub' corresponding to the gate signal Gate'. The AND arithmetic unit 410-2 then outputs the retrieved RF signal RF-Sub' to the slicer 210 shown in FIG. 1. As a result, since the RF signal RF-Sub' played back in the constant output zone of the recording pulse is selectively retrieved, a pit can be precisely detected.

Thereafter, the CPU 212 shown in FIG. 1 computes a correction condition of the strategy on the basis of the length and phase information of the detected pit and corrects the strategy condition to be output to the pulse generation circuit 300. As a result, real-time correction is carried out such that a recording condition is corrected while data is being recorded.

Figure 10:
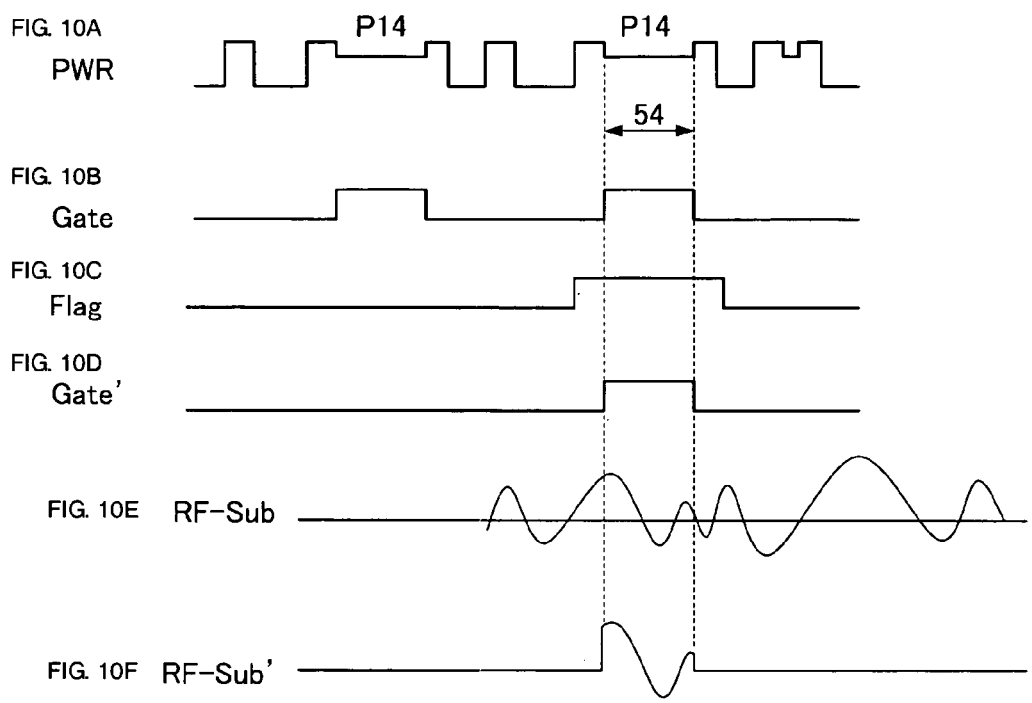
FIGS. 10A-F are timing diagrams illustrating a relationship between a recording pulse, a gate pulse, and a playback signal.

FIGS. 10A-F are timing diagrams illustrating a relationship between a recording pulse, a gate pulse, and a playback signal. As shown in FIG. 10A, the recording pulse PWR has a pulse pattern in which the ON and OFF states are switched in accordance with a predetermined data pattern. Here, if the constant output zone 54 of a pit 14T that has the longest unmodulated period is used as a gate signal, the gate signal Gate generated by the pulse generation circuit 300 shown in FIG. 1 is output at a timing shown in FIG. 10B. The flag signal Flag generated by the CPU 212 shown in FIG. 1 is output at a timing shown in FIG. 10C. The gate signal Gate' generated by the mask circuit 400 shown in FIG. 9 is output at a timing shown in FIG. 10D. As shown in FIG. 10F, using the gate signal Gate', an RF-Sub' signal is retrieved from the RF-Sub signal shown in FIG. 10E.

Thus, the finally retrieved playback signal RF-Sub' is a signal played back in the constant output zone 54 of the recording pulse PWR. Accordingly, by using this signal, a pit can be precisely detected, thereby enabling the accurate correction of the strategy.

FIG. 11 is a diagram schematically illustrating a generation method of a flag signal carried out by the CPU shown in FIG. 1. In this example shown in FIG. 11, the space 4T that exists in the constant output zone of the pit 14T is selectively detected. As shown in FIG. 11, the CPU 212 sequentially stores values corresponding to the lengths of recording pulses in a memory 214 shown in FIG. 1. The CPU 212 then identifies data including the space 4T (designated as "L4" in FIG. 11) in the constant output zone of the pit 14T (designated as "P14" in FIG. 11) and sets a flag for the identified data of the pit 14T.

Here, a time difference between the recording main beam and the playback sub beam is expressed as "τ". The CPU 212 converts the time difference τ to the number of clocks. The CPU 212 then compares the length of data present between the pit 14T and the space 4T with the time difference τ. If the data of the space 4T exists in a zone that is distant from the pit 14T by the time difference τ and that is within an area corresponds to the constant output zone of the pit 14T, the CPU 212 sets a flag for the pit 14T and outputs the flag signal Flag at the timing shown in FIG. 10C.

Figure 12:
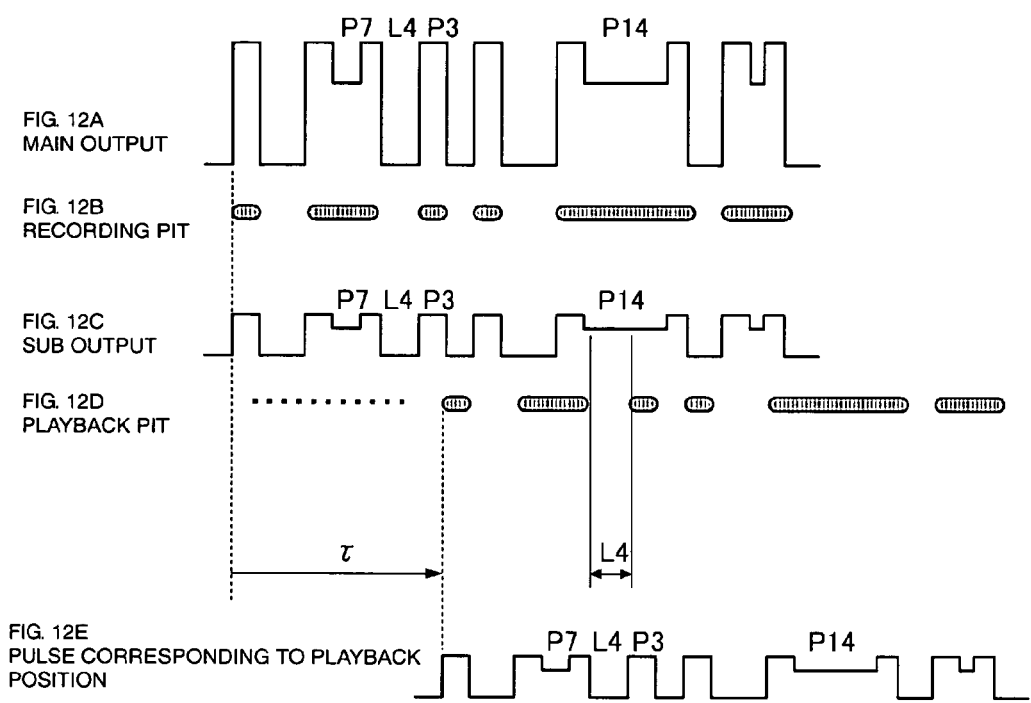
FIGS. 12A-E are timing diagrams illustrating a relationship between a recording main beam and a playback sub beam.
Figure 13:
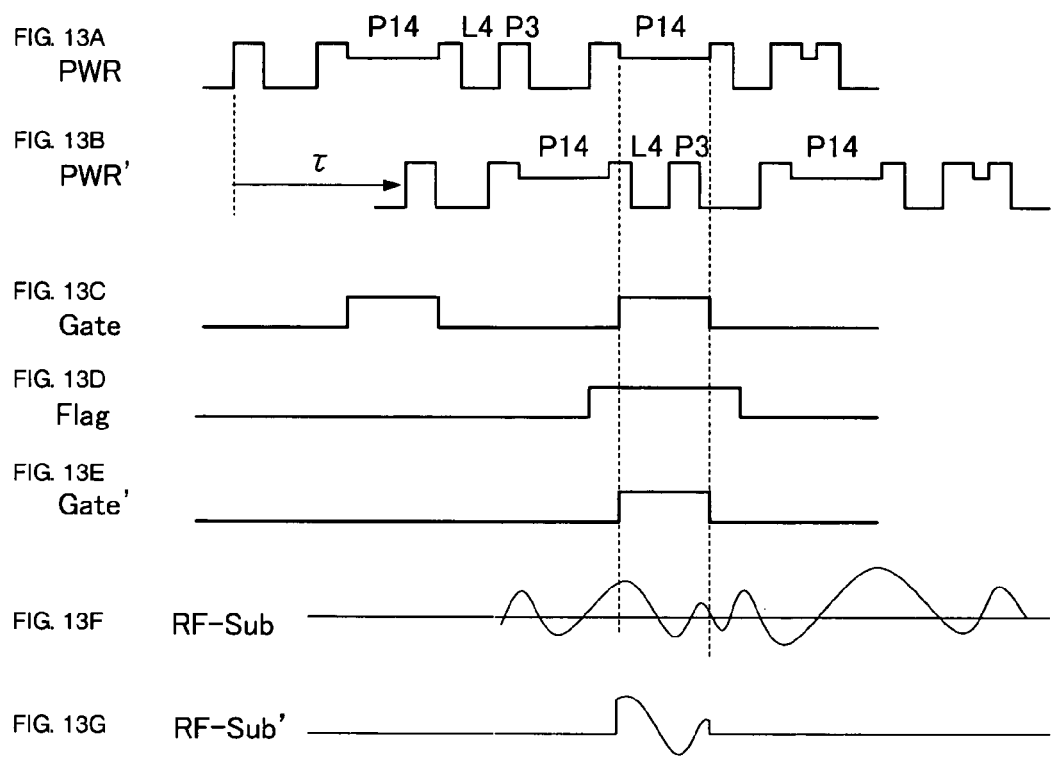
FIGS. 13A-G are timing diagrams illustrating a relationship between a recording pulse, a delayed pulse of the recording pulse, and an RF signal.

FIGS. 12A-E are timing diagrams illustrating a relationship between a recording main beam and a playback sub beam. As shown in FIG. 12A, the recording main beam is output in accordance with a high-output pulse pattern that is required for forming pits. This pulse irradiation forms a pit pattern on an optical disk, as shown in FIG. 12B.

In contrast, as shown in FIG. 12C, the playback sub beam is output at the same timing as that in the output pattern of the recording main beam. However, the level of the output is decreased by the branch ratio compared with the recording main beam. As shown in FIG. 12D, the pit pattern played back by the playback sub beam is delayed from a pit being recorded by the time difference τ.

Accordingly, as shown in FIG. 12E, the space 4T played back while the pit 14T is being recorded can be detected by identifying a position at which the space 4T of a pulse whose recording pulse pattern is delayed by the time difference τ is overlapped with the constant output zone of the pit 14T of the recording pulse. That is, a first gate signal is generated from the constant output zone of a long pit of the recording pulse. In addition, a second gate signal is generated from a pulse corresponding to a short pit or space to be detected in the pulse pattern of the recording pulse delayed by the time difference τ. Using these first and second gate signals, an RF signal obtained from the playback sub beam is masked.

FIGS. 13A-G are timing diagrams illustrating a relationship between a recording pulse, a delayed pulse of the recording pulse, and an RF signal. As shown in FIGS. 13A-G, by generating a pulse PWR', which is a pulse delayed from the recording pulse PWR by the time difference τ, and generating a gate signal Gate' from the zone containing the space 4T of the delayed pulse PWR' in the constant output zone of the pit 14T of the recording pulse PWR, a short pit or space can be selectively detected while a long pit is being recorded. As a result, the length error and the phase error of the pit can be accurately detected.

Figure 14:
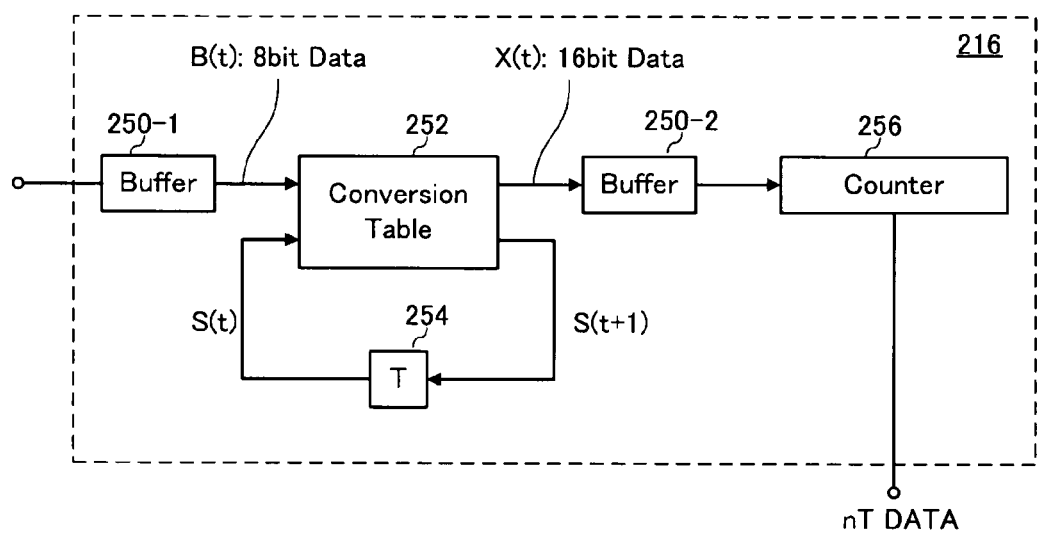
FIG. 14 is a block diagram illustrating a method for detecting a short pit or space while a long pit is being recorded.

FIG. 14 is a block diagram illustrating a method for detecting a short pit or space while a long pit is being recorded. In FIG. 14, an example of a configuration is shown in which the EFM encoder/decoder 216 shown in FIG. 1 detects a 4T space that is present under a sub beam while the main beam is recording a 14T pit.

In such a configuration, as shown in FIG. 14, the EFM encoder/decoder 216 temporarily stores an 8-bit digital signal input from the slicer 210 shown in FIG. 1 in a buffer 250-1 and, subsequently, converts 8-bit data output from the buffer 250-1 to 16-bit data using a conversion table 252. The EFM encoder/decoder 216 then outputs the converted data into a buffer 250-2. Simultaneously, a delay unit 254 carries out a delaying operation of a time T for each conversion.

The data stored in the buffer 250-2 is output to a counter 256. The data is converted to data representing a pulse length nT (n=3 to 14) by the CPU 212 shown in FIG. 1 and is output to the pulse generation circuit 300, which generates the corresponding recording pulse.

Figure 15:
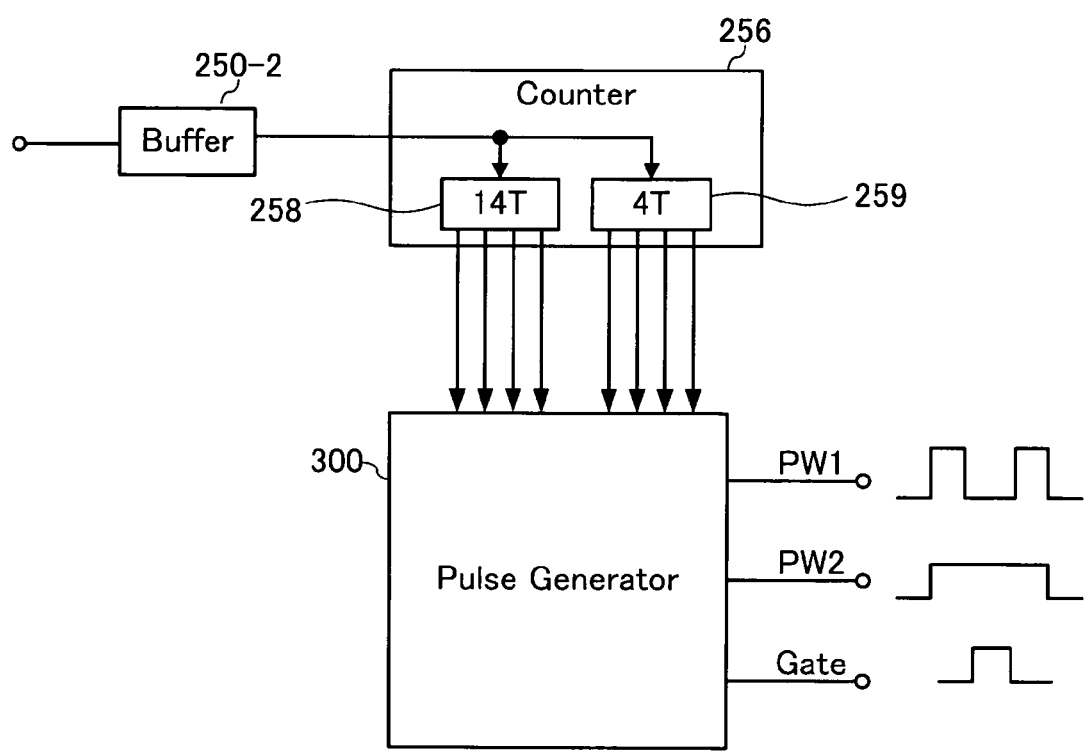
FIG. 15 is a block diagram illustrating a relationship between a counter 256 shown in FIG. 14 and a pulse generation circuit 300 shown in FIG. 1.

FIG. 15 is a block diagram illustrating a relationship between the counter 256 shown in FIG. 14 and the pulse generation circuit 300 shown in FIG. 1. As shown in FIG. 15, the counter 256 includes a 14T decoder 258 and a 4T decoder 259. The 14T decoder 258 and the 4T decoder 259 identify a bit string corresponding to the 14T pit and a bit string corresponding to the 4T space from a data stream flowing from the buffer 250-2 to the pulse generation circuit 300, respectively.

Figure 16:
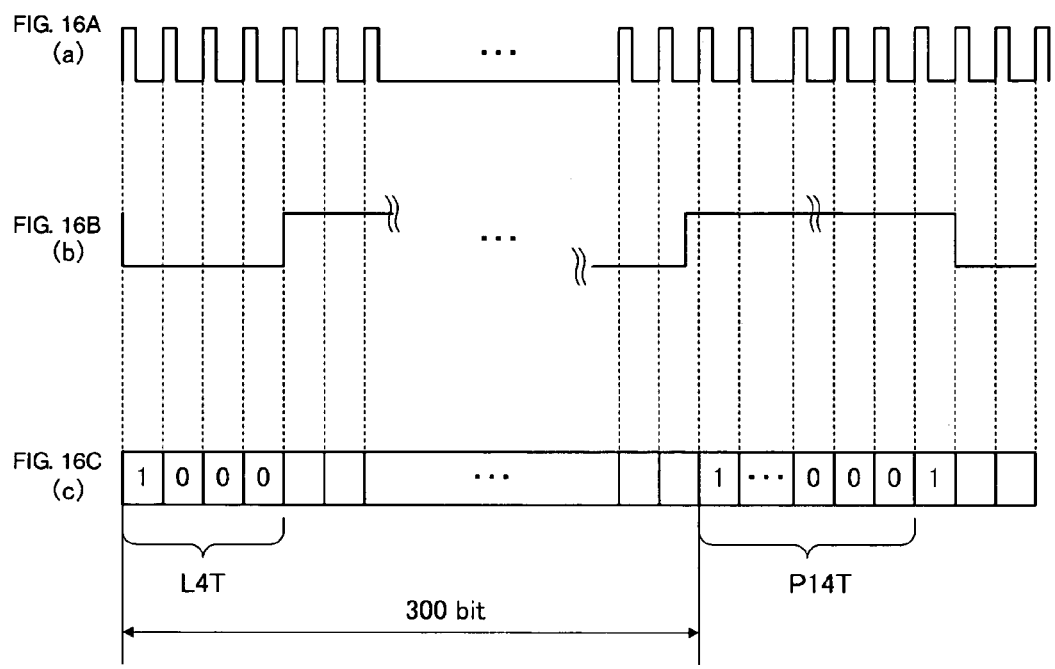
FIGS. 16A-C are diagrams schematically illustrating the case where a bit string is stored in a buffer 250-2 shown in FIG. 14.

FIGS. 16A-C are diagrams schematically illustrating the process in which a bit string is stored in the buffer 250-2 shown in FIG. 14. As shown in FIG. 16C, data indicating the length of a pit or space is stored in the buffer 250-2 in synchronization with a clock signal shown in FIG. 16A.

For example, the length of 3T is represented as "100". The length of 4T is represented as "1000". The length of 5T is represented as "10000", and the length of 14T is represented as "10000000000000".

Therefore, when a pulse shown in FIG. 16B is input, a bit string stored in the buffer 250-2 includes substrings of bits corresponding to the pulse width (e.g., a substring "1000" corresponding to the 4T space and a substring "10000000000000" corresponding to the 14T pit), as shown in FIG. 16C.

As shown in FIG. 16C, if the distance between the recording main beam and the playback sub beam corresponds to 300 bits, the position of the 14T pit currently recorded is identified from the bit stream stored in the buffer 250-2 to determine whether a bit string for the 4T space is present at the position distant from the 14T pit by 300 bits.

If the bit string for the 4T space is found, it is determined that the time has come that allows the sub beam to detect the 4T space while the main beam is recording the 14T pit. Accordingly, the condition of real-time correction is determined using the signal obtained at that time.

Figure 17:
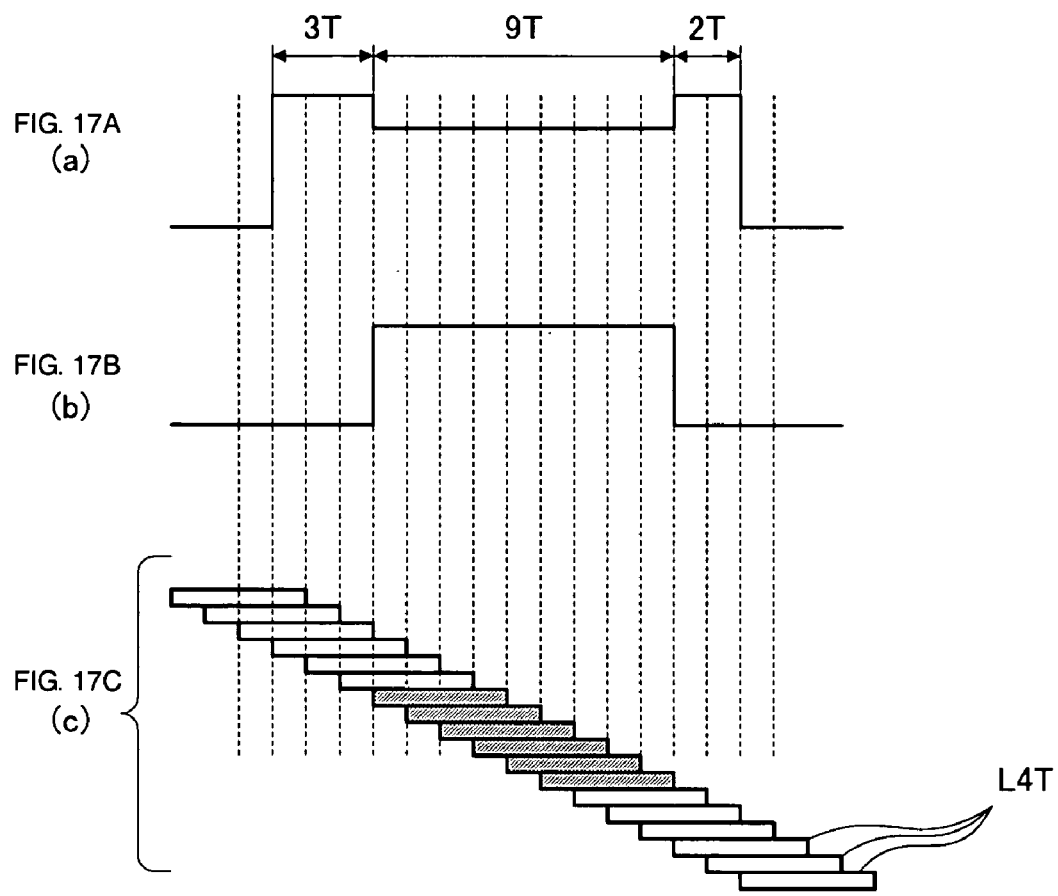
FIGS. 17A-C are diagrams schematically illustrating the variation of a 4T space to be detected while a 14T pit is being recorded.

FIGS. 17A-C are diagrams schematically illustrating the variation of the 4T space to be detected while the 14T pit is being recorded. As shown in FIG. 17A, when the recording pulse for the 14T pit includes a high-output 3T pulse, a constant output 9T pulse, and a high-output 2T pulse, a 4T space within the constant output zone becomes a detection target.

Accordingly, it is the most desirable to detect a 4T space that appears in the middle of the 14T pulse. However, the probability of the 4T space appearing in the middle of the 14T pulse is low. Therefore, a counter circuit is provided so that a 4T space whose both ends do not exceed the constant output zone of the 14T pit also becomes a detection target.

For example, a gate signal shown in FIG. 17B is generated from the pulse for the 14T pit shown in FIG. 17A. By preparing a data pattern that can identify a 4T space with hatching shown in FIG. 17C, a bit string matching the data pattern is retrieved.

Figure 18:
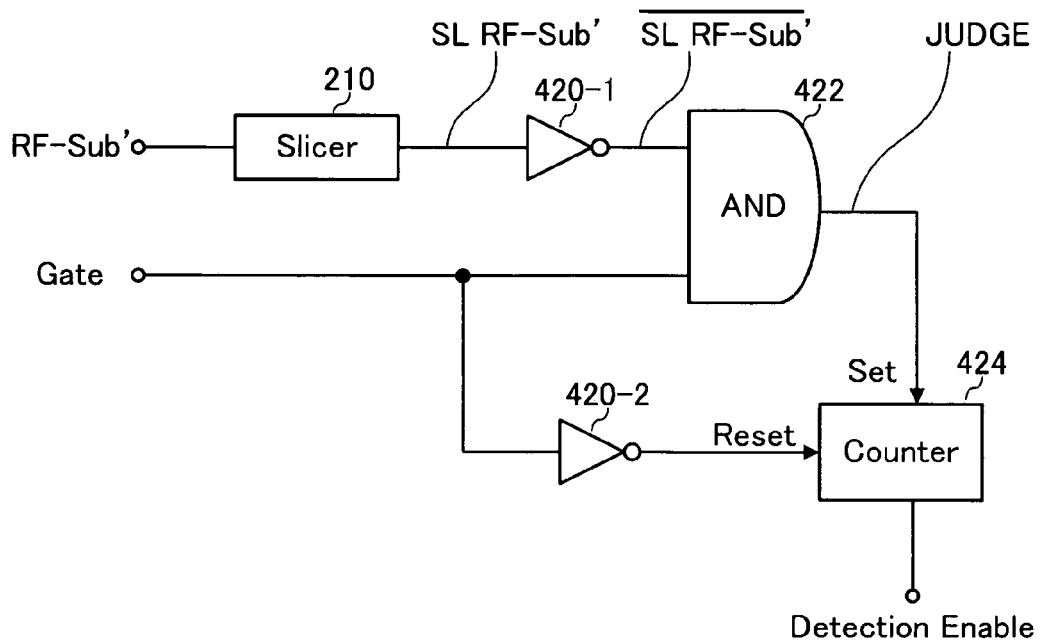
FIG. 18 is a block diagram illustrating another example of a method for detecting a short pit or space while a long pit is being recorded.

FIG. 18 is a block diagram illustrating another example of a method for detecting a short pit or space while a long pit is being recorded. In this example, it is determined whether a short pit or space is present while a long pit is being recorded on the basis of the number of pulses generated in a predetermined period of time.

In a circuit block shown in FIG. 18, a digital signal "SL RF-Sub'" output from a slicer 210 are input to an AND arithmetic unit 422 via an inverting circuit 420-1. Also, a gate signal Gate output from the pulse generation circuit 300 shown in FIG. 1 is input to the AND arithmetic unit 422.

The AND arithmetic unit 422 outputs a logical multiplication of these input signals to a set terminal of a counter 424, which counts the number of pulses generated in a period indicated by a gate signal inverted by an inverting circuit 420-2. The result, which serves as a determination signal "Detection Enable", is output to the CPU 212 shown in FIG. 1. It is noted that the gate signal inverted by the inverting circuit 420-2 is used as a reset signal of the counter 424.

The CPU 212 determines whether a 4T space is present while a 14T pit is being recorded by determining whether the number of pulses indicated by the determination signal is greater than or equal to a predetermined number (e.g., 2). If it is determined that the 4T space is present, the CPU 212 retrieves a signal obtained from the 4T space.

FIGS. 19A-G are timing diagrams illustrating an exemplary process of the circuit block shown in FIG. 18. As shown in FIG. 19A, the signal RF-Sub' input to the slicer 210 is digitized at a predetermined level to generate a pulse signal "SL RF-Sub'".

Subsequently, the pulse generation circuit 300 shown in FIG. 1 computes a logical multiplication of a gate signal Gate shown in FIG. 19E generated from signals shown in FIGS. 19C and 19D and an inverted signal shown in FIG. 19F generated by the inverting circuit 420-1. Thus, the determination signal "Detection Enable" shown in FIG. 19G is generated.

FIGS. 20A-D are diagrams schematically illustrating a determination criterion of the determination signal generated by the circuit block shown in FIG. 18. As shown in FIGS. 20A-D, in this example, if two or more pulses are counted in a period of FIG. 20A, it is determined that a space within the gate signal Gate, which represents a stable zone of 14T, (e.g., one of 3T to 7T spaces) is present while the 14T pit is being recorded. Thus, a signal obtained from the 4T space is retrieved.

Accordingly, as shown in FIG. 20B, when two pulses are counted within the gate signal, it is determined that a space within the gate signal Gate, which represents a stable zone of 14T, (e.g., one of 3T to 7T spaces) is present while the 14T pit is being recorded. Thus, a signal obtained from the 4T space is retrieved. In contrast, if, as shown in FIGS. 20C and 20D, only one pulse is counted, it is determined that the 4T space is not present while the 14T pit is being recorded, and the signal is not retrieved.

Figure 21:
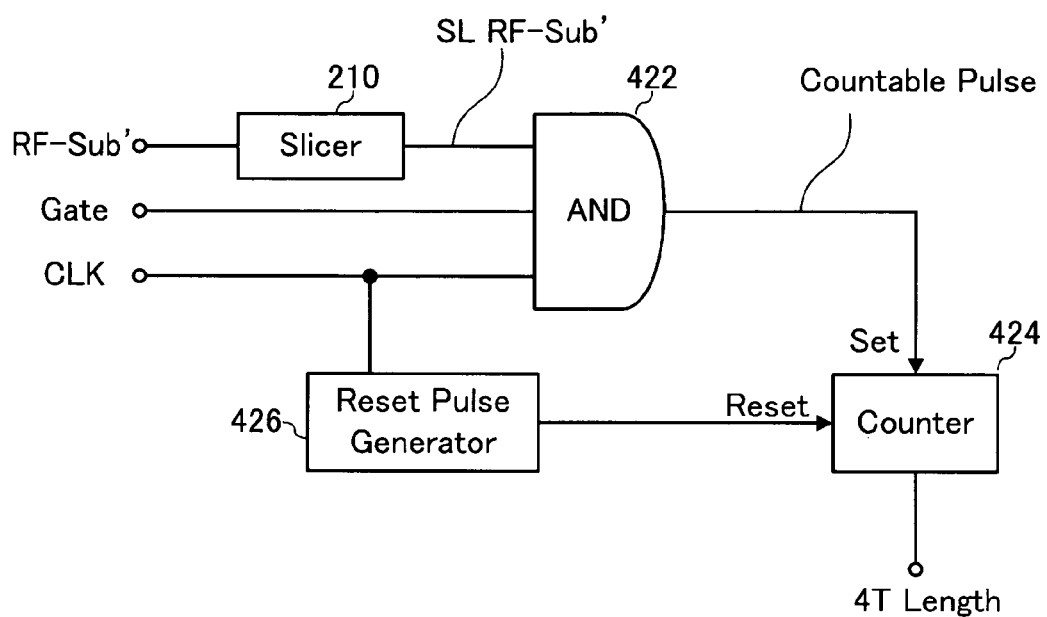
FIG. 21 is a block diagram illustrating still another example of a method for detecting a short pit or space while a long pit is being recorded.

FIG. 21 is a block diagram illustrating still another example of a method for detecting a short pit or space while a long pit is being recorded. In this example, it is determined whether a short pit or space is present while a long pit is being recorded by measuring the length of a pulse generated within a gate signal.

In a circuit block shown in FIG. 21, an AND arithmetic unit 422 computes a logical multiplication of a digital signal "SL RF-Sub'" output from a slicer 210, a gate signal Gate output from the pulse generation circuit 300 shown in FIG. 1, and a clock signal CLK. The resultant signal is input to a set terminal of a counter 424 as a countable signal "Countable Pulse". The counter 424 counts the length of this signal. It is noted that a reset pulse generated by a reset pulse generation circuit 426 is also input to the counter 424.

FIGS. 22A-E are timing diagrams illustrating an exemplary process of the circuit block shown in FIG. 21. As shown in FIG. 22A, a signal RF-Sub' input to the slicer 210 is digitized at a predetermined level to generate a pulse signal "SL RF-Sub'" shown in FIG. 22B.

Thereafter, a logical multiplication of a gate signal Gate (see FIG. 22C) generated by the pulse generation circuit 300 shown in FIG. 1 and the clock signal CLK shown in FIG. 22D is computed so as to generate the countable signal "Countable Pulse" shown in FIG. 22E. While this example is described with reference to a clock signal in which 1T=1 cycle, a higher-speed clock (e.g., 1T=40 cycles) may be used to improve the resolution of detecting length.

FIGS. 23A-D are timing diagrams illustrating an exemplary process of the reset pulse generation circuit 426 shown in FIG. 21. As shown in FIGS. 23A-D, the reset pulse generation circuit 426 counts the clock signal CLK shown in FIG. 23A once per two pulses to generate an intermediate signal CLK/2 shown in FIG. 23B. Furthermore, the reset pulse generation circuit 426 counts this intermediate signal CLK/2 once per two pulses to generate an intermediate signal CLK/4 shown in FIG. 23C.

Thereafter, as shown in FIG. 23D, the reset pulse generation circuit 426 generates a reset signal Reset that rises in synchronization with the second rise shown in FIG. 23C and falls at a time after scanning a length corresponding to the gate signal Gate. When this reset signal is input to a reset terminal of the counter 424 shown in FIG. 21, the count of the counter 424 is reset.

If, in FIG. 23A, a clock signal having "1T=40 cycles" is used and the gate signal Gate has a width corresponding to 9T, the reset signal Reset shown in FIG. 23D rises when the clock signal is counted 360 times, and therefore, the counter 424 is reset.

Similarly, if, in FIG. 23A, a clock signal having "1T=2.5 cycles" is used and the gate signal Gate has a width corresponding to 9T, the reset signal Reset shown in FIG. 23D rises when the clock signal is counted 22.5 times, and therefore, the counter 424 is reset. However, when the cycle of the clock signal is not an integral multiple of the unit length T, the cycle is regarded as an integral multiple of the unit length T (e.g., 2T=5 cycles).

Figure 24:
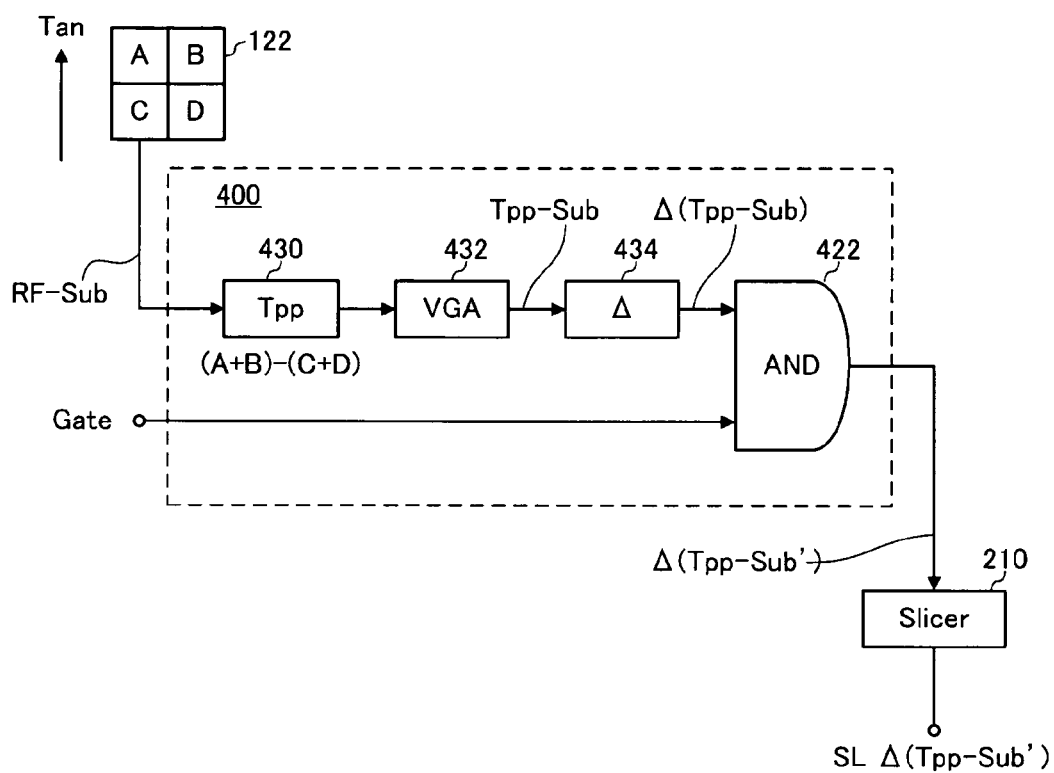
FIG. 24 is a block diagram of the mask circuit shown in FIG. 1 having another configuration.

FIG. 24 is a block diagram of the mask circuit shown in FIG. 1 having another configuration. The mask circuit shown in FIG. 24 carries out length detection using a tangential push-pull signal Tpp.

As shown in FIG. 24, a mask circuit 400 includes a tangential push-pull signal generation circuit 430, a volume gain amplifier (VGA) circuit 432, a differential circuit 434, and an AND arithmetic unit 422. The tangential push-pull signal generation circuit 430 generates the tangential push-pull signal Tpp using a signal from a detector 122 having four divided regions. The VGA circuit 432 makes the amplitude of the tangential push-pull signal Tpp constant. The differential circuit 434 differentiates the tangential push-pull signal Tpp. The AND arithmetic unit 422 computes a logical multiplication of the derivative value of the tangential pull signal Tpp and a gate signal Gate.

As shown in FIG. 24, the detector 122 includes divided regions A, B, C, and D in relation to a direction Tan of the tangential line of rotation. Here, the tangential push-pull signal generation circuit 430 computes a difference between the sum of signals from the regions A and B located at the front in the rotational direction and the sum of signals from the regions C and D located at the rear in the rotational direction. The tangential push-pull signal generation circuit 430 then outputs the difference signal as the tangential push-pull signal Tpp. As shown in FIG. 24, this relation is expressed as: Tpp=(A+B)−(C+D).

The VGA circuit 432 generates a signal Tpp-Sub having a constant amplitude from the tangential push-pull signal Tpp. The differential circuit 434 receives the signal Tpp-Sub and differentiates the signal Tpp-Sub to generate a signal Δ(Tpp-Sub).

The AND arithmetic unit 422 computes a logical multiplication of the signal Δ(Tpp-Sub) and the gate signal Gate to retrieve a signal Δ(Tpp-Sub') corresponding to an optical power constant output zone of a recording pulse. The slicer 210 slices this signal Δ(Tpp-Sub') by a zero level to generate a signal "SL Δ(Tpp-Sub")".

FIGS. 25A-C are first timing diagrams illustrating the operation of the circuit shown in FIG. 24. As shown in FIG. 25A, in terms of an RF signal detected by the detector shown in FIG. 24, the amplitude and zero point of a signal designated by reference numeral X1.0 for 1.0× speed recording are different from those of a signal designated by reference numeral X1.5 for 1.5× speed recording.

Additionally, as shown in FIG. 25B, in terms of the waveform of the tangential push-pull signal Tpp-Sub output from the VGA circuit 432 shown in FIG. 24, the amplitude of a signal designated by reference numeral X1.0 for 1.0× speed recording is different from that of a signal designated by reference numeral X1.5 for 1.5× speed recording. However, the zero points of these two signals are the same. The zero point of the tangential push-pull signal Tpp-Sub corresponds to the peak point of the RF signal RF-Sub shown in FIG. 25A.

Additionally, in terms of the waveform of the derivative value Δ(Tpp-Sub) of the tangential push-pull signal output from the differential circuit 434 shown in FIG. 24, as shown in FIG. 25C, the amplitude of a signal designated by reference numeral X1.0 for 1.0× speed recording is different from that of a signal designated by reference numeral X1.5 for 1.5× speed recording. However, the zero points of these two signals are the same. The zero point of the derivative value Δ(Tpp-Sub) of the tangential push-pull signal corresponds to the peak point of the tangential push-pull signal Tpp-Sub shown in FIG. 25B and also corresponds to a point at which the slope of the RF signal RF-Sub shown in FIG. 25A becomes maximum.

FIGS. 26A-D are second timing diagrams illustrating the operation of the circuit shown in FIG. 24. FIG. 26A illustrates the derivative value Δ(Tpp-Sub) of the tangential push-pull signal output from the differential circuit 434 shown in FIG. 24. This derivative value is masked by the gate signal Gate shown in FIG. 26B. As shown in FIG. 26C, the derivative value Δ(Tpp-Sub) of the tangential push-pull signal becomes the signal Δ(Tpp-Sub') clipped using the gate signal Gate.

Subsequently, the zero cross point of the signal Δ(Tpp-Sub') is retrieved by the slicer 210 shown in FIG. 24 to generate a pulse signal "SL Δ(Tpp-Sub')" as shown in FIG. 26D. This pulse signal serves as the above-described short pit signal or space signal that is present in the high power constant output period of the recording pulse. In the above-described example, this pulse signal serves as a detection signal of the 4T space.

By employing the configuration that detects the length of a pit or a space using the derivative value of the tangential push-pull signal, the error of the length is detected in real time and recording is carried out while correcting the error.

Here, as described above, use of the derivative value of the tangential push-pull signal alone could not detect a proper length, since the interference of a short signal, such as 3T or 4T, occurs.

Therefore, in this embodiment, the derivative value of a tangential push-pull signal that serves as a correction reference is computed in advance from test recording on a test area. When recording actual data on a recording area, a pit or space recorded using a recording laser beam is played back using a playback laser beam. The derivative value of a tangential push-pull signal is computed from the obtained playback signal. A difference between the derivative value obtained from the recording area and the derivative value obtained from the test area is considered to be a length error. Thereafter, a suitable recording condition for correcting the length error is set.

Figure 27A:
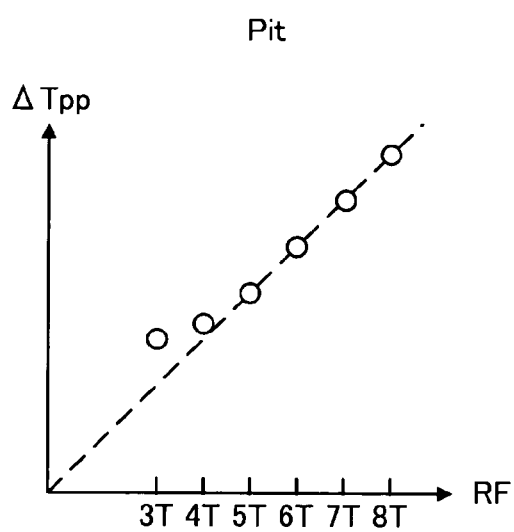
FIGS. 27A and 27B are graphs illustrating a relationship between the derivative values of tangential push-pull signals about a pit and a space obtained from the test area and actual physical lengths of the pit and the space.
Figure 27B:
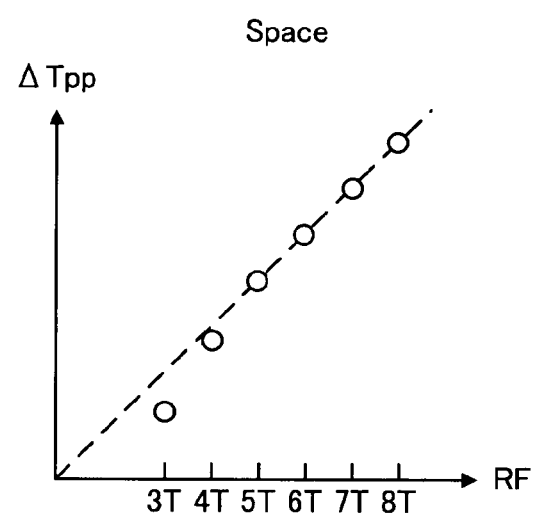

FIGS. 27A and 27B are graphs illustrating a relationship between the derivative values of tangential push-pull signals about a pit and a space obtained from the test area and actual physical lengths of the pit and the space. As shown in FIG. 27A, by carry out test recording to form pits of, for example, 3T to 8T in the test area, the derivative value of a tangential push-pull signal for each pit length can be obtained. The length of each pit can be estimated from the derivative value. Here, for the relatively long pits of 5T to 8T, a length corresponding to the proper physical length (shown by a dotted line in the drawing) can be obtained. However, for the 3T or 4T pit that is easily affected by interference, a length that is different from the proper physical length is detected.

Similarly, as shown in FIG. 27B, by carry out test recording to form spaces of, for example, 3T to 8T in the test area, the derivative value of a tangential push-pull signal for each space length can be obtained. The length of each space can be estimated from the derivative value. Here, for the relatively long spaces of 5T to 8T, a length corresponding to the proper physical length (shown by a dotted line in the drawing) can be obtained. However, for the 3T or 4T space that is easily affected by interference, a length that is different from the proper physical length is detected.

Accordingly, by using the derivative value of a tangential push-pull signal for each pit length shown in FIG. 27A as the correction reference or by using the derivative value of a tangential push-pull signal for each space length shown in FIG. 27B as the correction reference, the effect of the interference can be eliminated.

FIGS. 28A and 28B are graphs illustrating a relationship between the derivative values of tangential push-pull signals about a pit and a space obtained from the recording area and the derivative values of tangential push-pull signals about a pit and a space obtained from the test area. As shown in FIG. 28A, by playing back a pit pattern of a length of, for example, 3T to 8T using a playback laser beam while recording the pit pattern in the recording area using a recording laser beam, the derivative value of a tangential push-pull signal for each pit length (shown by a black circle in the drawing) can be obtained. By carrying out correction such that this derivative value is made equal to a derivative value obtained by test recording (shown by a white circle in the drawing), a recording pattern including a pit and a space fit to the proper physical lengths can be formed.

Similarly, as shown in FIG. 28B, by playing back a space pattern of a length of, for example, 3T to 8T using a playback laser beam while recording the space pattern in the recording area using a recording laser beam, the derivative value of a tangential push-pull signal for each space (shown by a black circle in the drawing) can be obtained. By carrying out correction such that this derivative value is made equal to a derivative value obtained by test recording (shown by a white circle in the drawing), a recording pattern including a pit and a space fit to the proper physical lengths can be formed.

FIG. 29 is a diagram schematically illustrating an example of test recording for obtaining the derivative value of a tangential push-pull signal in a test area. As shown in FIG. 29, by carrying out test recording using a pattern capable of examining the effect of a front phase shift, a rear phase shift, and thermal interference of a recording pulse, RF lengths a01 to a15 and derivative values b01 to b15 of a tangential push-pull signal for the corresponding pits or spaces are obtained and are stored in a predetermined recording area.

FIG. 30 is a diagram schematically illustrating an example of test recording for obtaining the derivative value of a tangential push-pull signal in a recording area. As shown in FIG. 30, by retrieving a pattern capable of examining the effect of a front phase shift, a rear phase shift, and thermal interference of a recording pulse from a pattern of a pit and a space formed in the recording area, derivative values c01 to c15 of a tangential push-pull signal and differences between the tangential push-pull signals obtained from the recording area and the tangential push-pull signals obtained from the test area shown in FIG. 29 are computed for the corresponding pits or spaces and are stored in a predetermined recording area.

Figure 31:
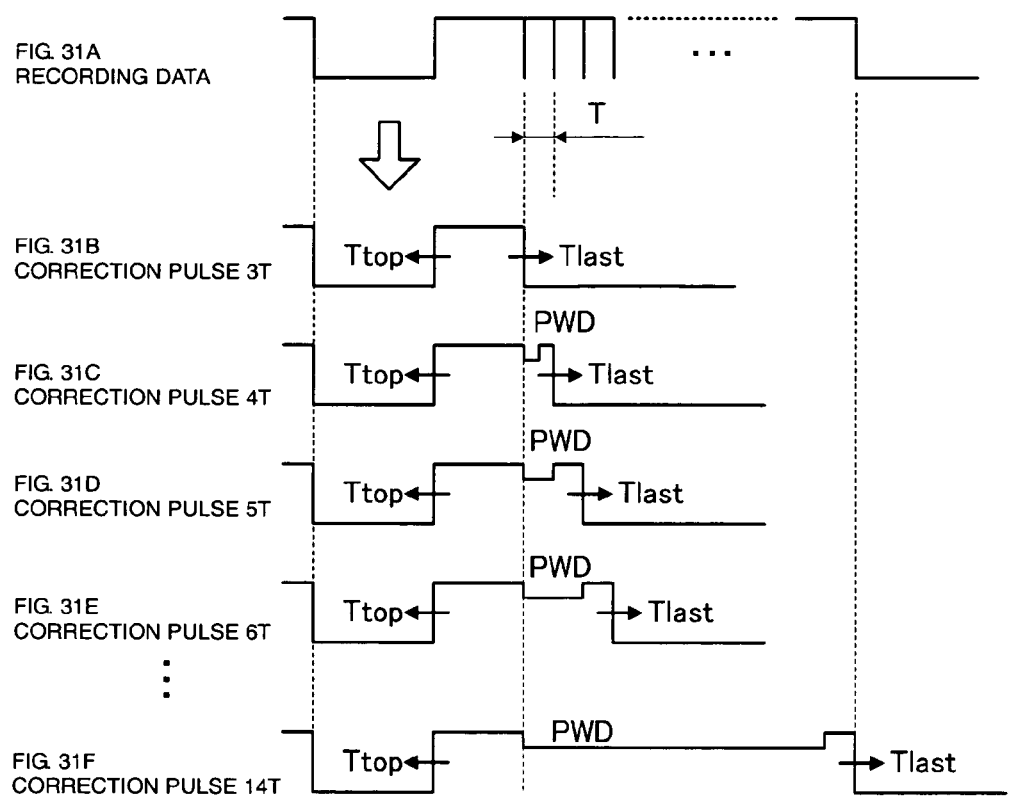
FIGS. 31A-F are diagrams schematically illustrating an example of correcting a recording pulse using a difference between tangential push-pull signals shown in FIG. 30.

FIGS. 31A-F are diagrams schematically illustrating an example of correcting a recording pulse using a difference of a tangential push-pull signal shown in FIG. 30. As shown in FIGS. 31A-F, when recording data shown in FIG. 31A on an optical disk, a strategy having an optimum correction value for each pit length is set. For example, as shown in FIG. 31B, when recording a 3T pit, a leading edge correction value Ttop in the entry "Front phase shift"-"3T pit" of the recording data shown in FIG. 30 is read out, and the trailing edge correction value Tlast of the 3T pit is also read out. Subsequently, the leading edge and trailing edge of the recording pulse are corrected using the values Ttop and Tlast.

Also, when recording a pit greater than or equal to a 4T pit, as shown in FIGS. 31C-F, the shape of the pulse is corrected using a height PWD of the constant zone of the pit length in addition to the values Ttop and Tlast.

Figure 32:
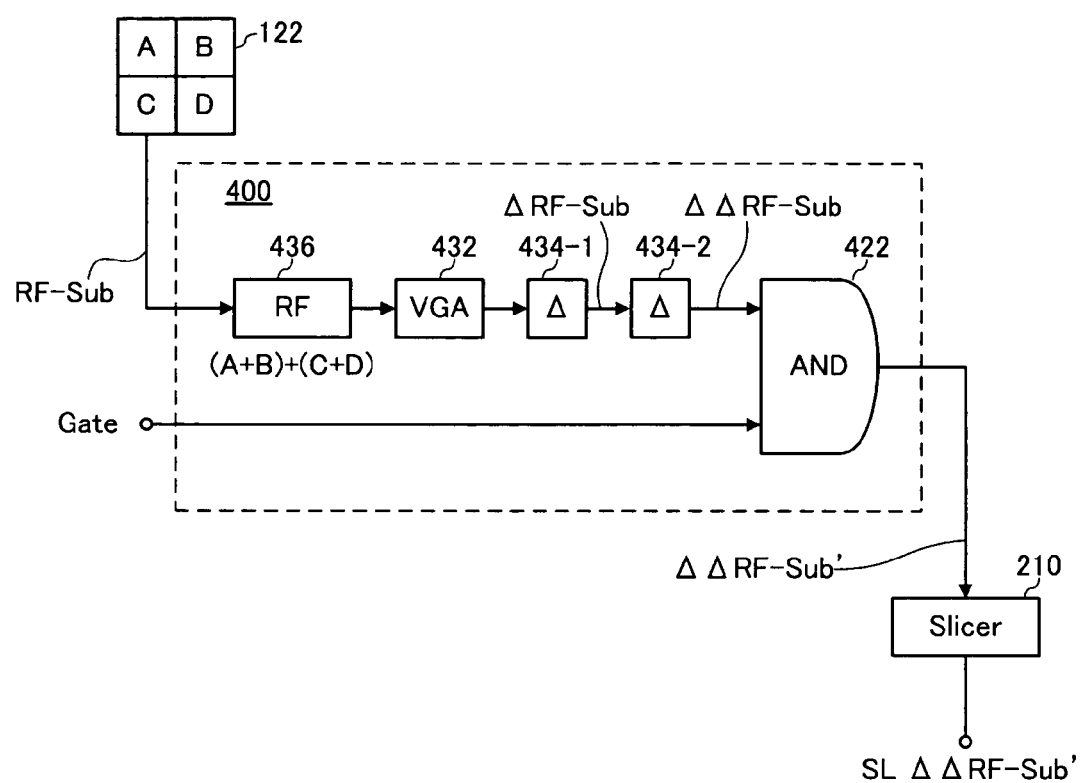
FIG. 32 is a block diagram illustrating another configuration of the mask circuit shown in FIG. 1.

FIG. 32 is a block diagram illustrating another configuration of the mask circuit shown in FIG. 1. A mask circuit shown in FIG. 32 carries out length detection using the second deviation value of an RF signal.

As shown in FIG. 32, a mask circuit 400 includes an RF signal generation circuit 436, a volume gain amplifier (VGA) circuit 432, differential circuits 434-1 and 434-2, and an AND arithmetic unit 422. The RF signal generation circuit 436 generates an RF signal using a signal from a detector 122 having four divided regions. The VGA circuit 432 makes the amplitude of the RF signal constant. The differential circuits 434-1 and 434-2 differentiate the RF signal twice. The AND arithmetic unit 422 computes a logical multiplication of the second derivative value and a gate signal Gate.

Here, the RF signal generation circuit 436 outputs the sum of signals output from divided regions A, B, C, and D of the detector 122 as an RF signal Tpp. As shown in FIG. 32, this relation is expressed as: RF=(A+B)+(C+D).

The VGA circuit 432 generates a signal RF-Sub having a constant amplitude from this RF signal. The differential circuit 434-1 differentiates the signal RF-Sub to generate a signal ΔRF-Sub. The differential circuit 434-2 differentiates the signal ΔRF-Sub to generate a signal ΔΔRF-Sub.

The AND arithmetic unit 422 computes a logical multiplication of the signal ΔΔRF-Sub and the gate signal Gate to retrieve a signal ΔΔRF-Sub' corresponding to an optical-power stable zone of a recording pulse. The slicer 210 slices this signal ΔΔRF-Sub' by a zero level to generate a signal "SL ΔΔRF-Sub'".

Figure 33:
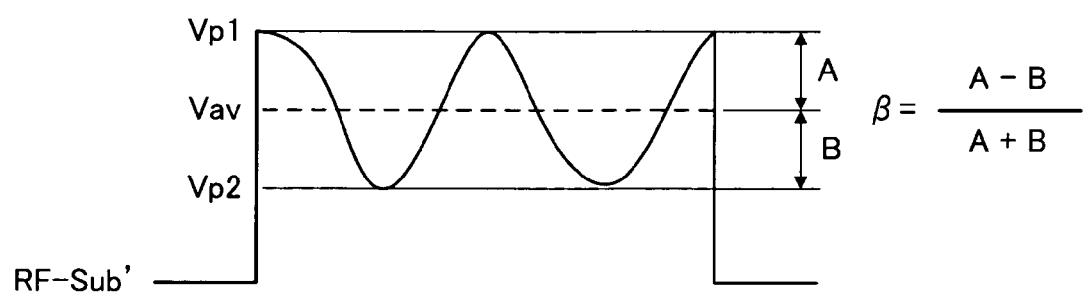
FIG. 33 is a diagram for schematically illustrating a scheme for detecting a β value as an index of optimum power adjustment.

FIG. 33 is a diagram for schematically illustrating a scheme for detecting a β value serving as an index of optimum power adjustment. The signal RF-Sub' shown in FIG. 33 is a signal retrieved, using the gate signal Gate', from an RF signal RF-Sub played back by the playback following sub beam 20E and output from the light receiving unit 122E shown in FIG. 4.

This RF signal RF-Sub' swings between peak values Vp1 and Vp2, which vary depending on the length of a pit or a land to be played back. In general, the β value serving as an index of optimum power adjustment can be obtained from a ratio of the positive amplitude to the negative amplitude when an RF signal is AC-coupled. However, since the waveform of a signal obtained from the playback sub beam is affected by turning on and off the recording pulse, the signal becomes an on-and-off pulse signal, and therefore, it is difficult to obtain the amplitude ratio of an AC-coupled signal.

Therefore, according to one embodiment of the present invention, a DC-like reference level is determined by obtaining an average value Vav of the signal RF-Sub' retrieved from a portion corresponding to the constant output zone of the recording signal with the gate signal Gate'. By obtaining differences between the average value Vav and the peak value Vp1 and between the average value Vav and the peak value Vp2, the β value can be obtained even from the on-and-off RF signal affected by turning on and off the recording pulse.

Here, the β value can be obtained by using a difference A between the average value Vav and the peak value Vp1 and a difference B between the average value Vav and the peak value Vp2 as follows:

$$\beta = (A-B)/(A+B).$$

The relationship between Vp1, Vp2, Vav, A, B, and β is shown in FIG. 33.

Figure 34:
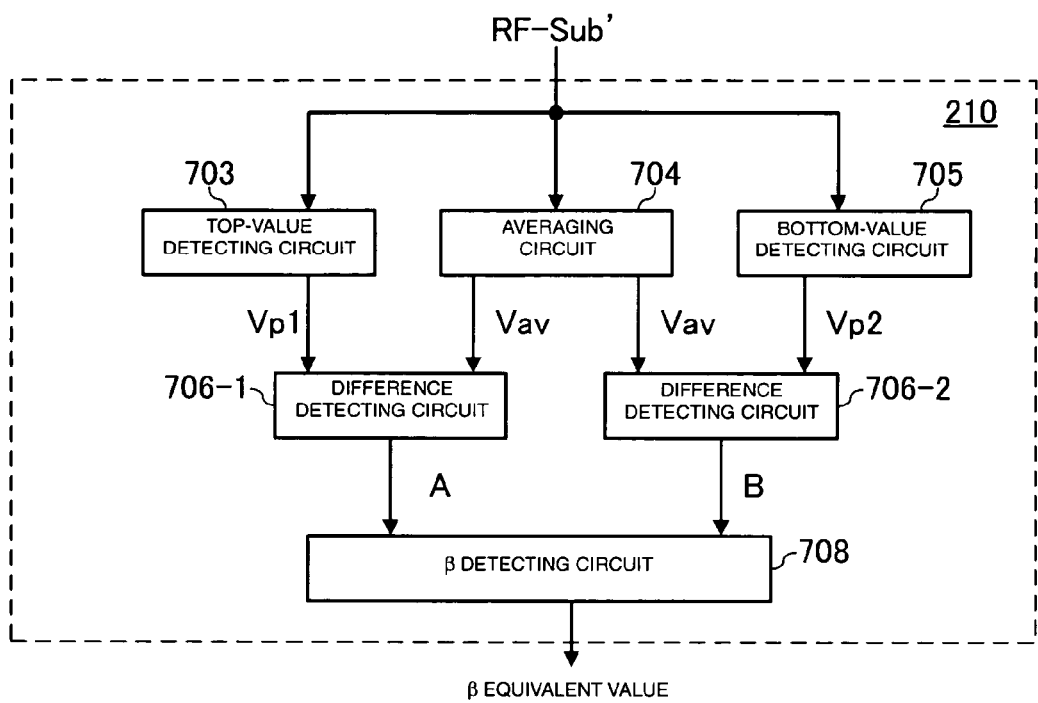
FIG. 34 is a block diagram illustrating a circuit block for detecting a β equivalent value.

FIG. 34 is a block diagram illustrating a circuit block for detecting a β equivalent value. This circuit block is provided inside the slicer 210 shown in FIG. 1. The circuit block includes a top value detecting circuit 703, a bottom value detecting circuit 705, an averaging circuit 704, difference detecting circuits 706-1 and 706-2, and a β detecting circuit 708. The top value detecting circuit 703 detects the top peak value Vp1 of the signal RF-Sub' obtained from the mask circuit 400, while the bottom value detecting circuit 705 detects the bottom peak value Vp2. The averaging circuit 704 detects the average value Vav of the signal RF-Sub'. The difference detecting circuits 706-1 and 706-2 detect the difference value A between Vp1 and Vav and the difference value B between Vp2 and Vav, respectively. The β detecting circuit 708 detects a β equivalent value using the difference values A and B. Using the obtained β equivalent value, the power is adjusted in real time.

Figure 35:
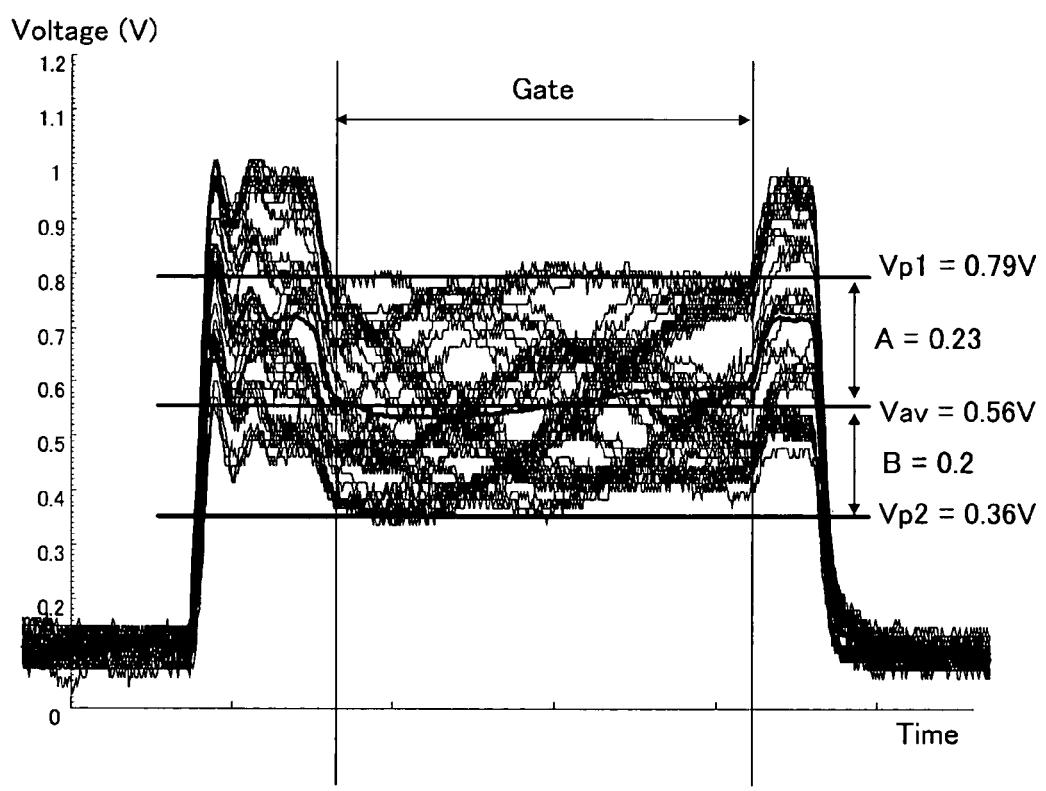
FIG. 35 is a graph illustrating an example of a β value obtained from an actual RF waveform.

FIG. 35 is a graph illustrating an example of a β value obtained from an actual RF waveform. As shown in FIG. 35, parameters Vp1, Vp2, and Vav used for detecting the β value were obtained in the constant output zone designated by "Gate". In this example, Vp1=0.79 V, Vp2=0.36 V, and Vav=0.56 V. Accordingly, the difference A between Vp1 and Vav was 0.23, while the difference B between Vp2 and Vav was 0.2. The β value was about 0.7 according to the equation β=(A−B)/(A+B) (=0.03/0.43).

Figure 36:
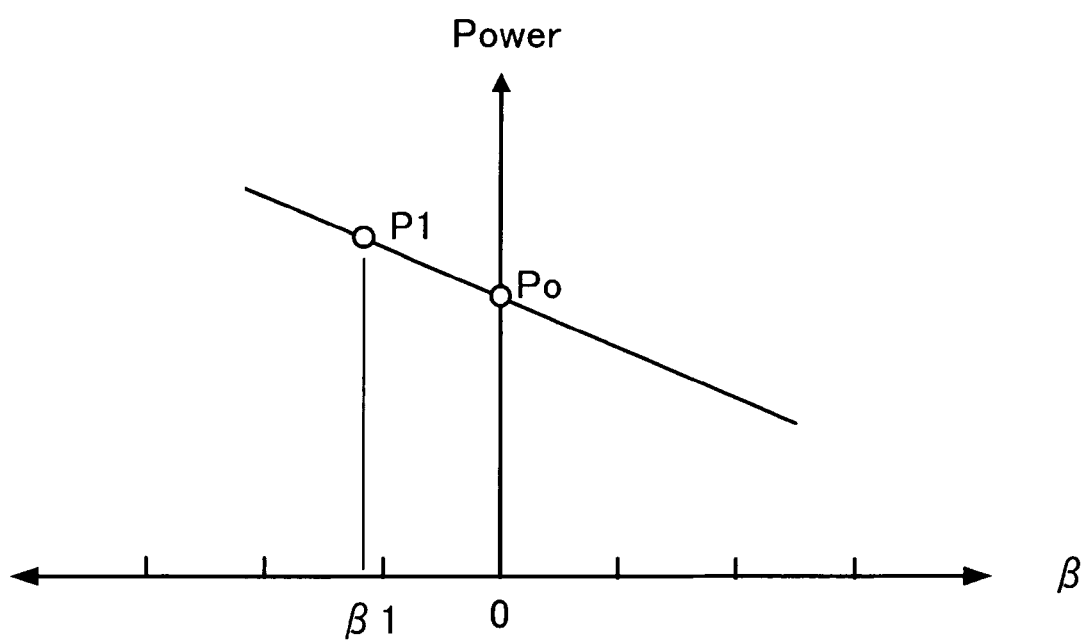
FIG. 36 is a diagram schematically illustrating the process of a real-time power adjustment.

FIG. 36 is a diagram schematically illustrating the process of the real-time power adjustment. As shown in FIG. 36, the characteristic of the β value with respect to the variation of power is substantially linear. Since the zero point of the characteristic of the β value provides an optimum power Po, the optimum power Po at any point can be obtained using this linear characteristic when the real-time detected β value is β1 and the power value is P1 at that point.

While this embodiment has been described with reference to the β value obtained by using the peak value and average value of an RF signal, a tangential push-pull signal may be used in place of the RF signal. Alternatively, the derivative value of a tangential push-pull signal may be used.

Figure 37:
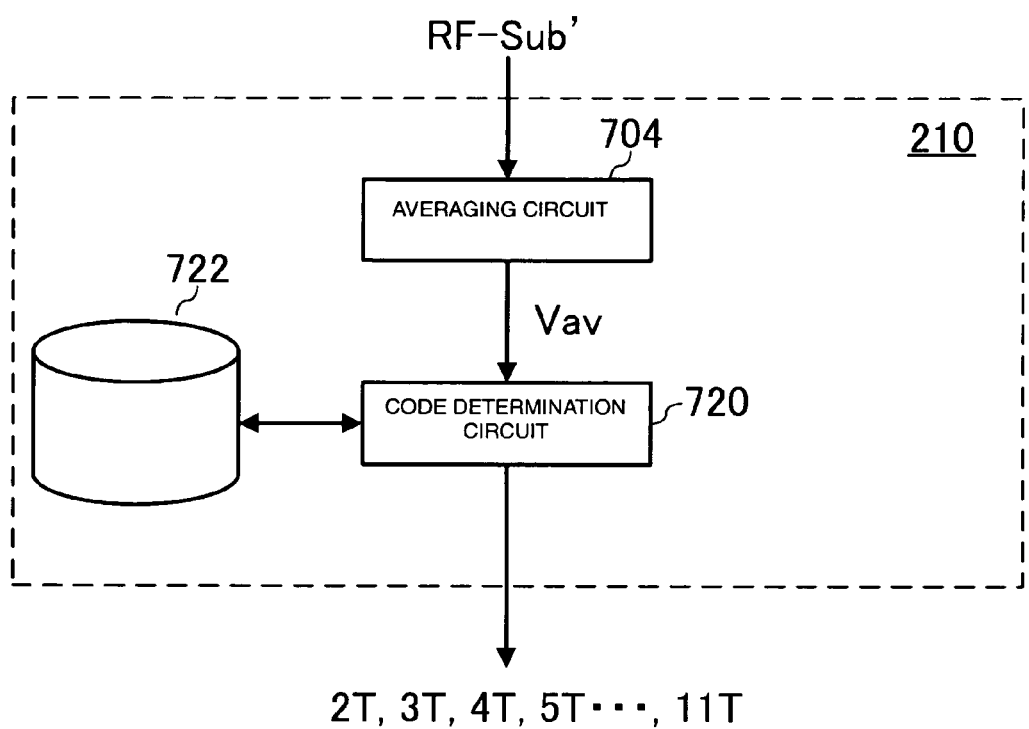
FIG. 37 is a block diagram for carrying out code determination using an average value.

FIG. 37 is a block diagram for carrying out code determination using the above-described average value. As shown in FIG. 37, the value Vav detected by the averaging circuit 704 is input to a code determination circuit 720 to compare the signal Vav with an entry of a data table 722. Thus, the code determination can be made from the average value Vav.

FIG. 38 schematically illustrates an exemplary structure of the data table 722 shown in FIG. 37. As shown in FIG. 38, an available average value Vav is set for each of the codes 2T to 11T. By determining which range numerically encompasses a value input from the averaging circuit 704, the detected pit and/or space can be converted to the code information.

Figure 39:
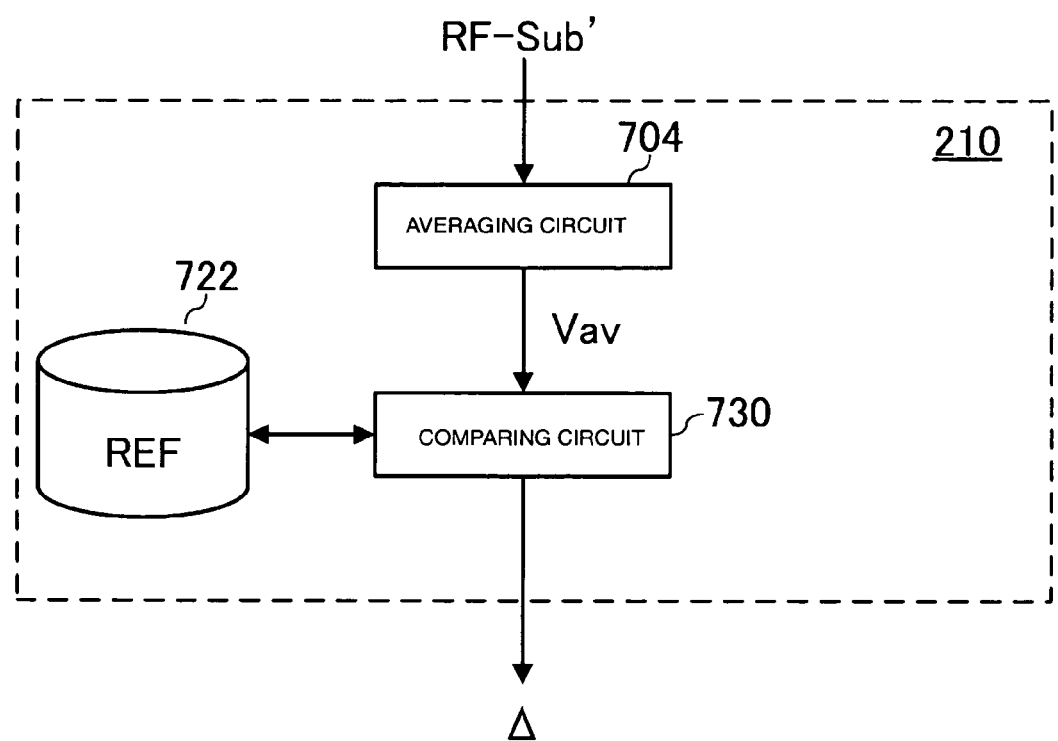
FIG. 39 is a block diagram illustrating an example of detecting a shift and a space using the average value.

FIG. 39 is a block diagram for detecting a shift amount of a pit and space using the above-described average value. As shown in FIG. 39, by using a comparing circuit 730 to compare a value input from the averaging circuit 704 with a reference value for each code stored in the data table 722, the shift amount of the formed pit and space can also be detected.

According to the present invention, real-time correction of a recording condition can be carried out to provide an optimum recording condition. Consequently, this method can be applied to a recording environment that requires more stringent conditions, such as recording on a medium having different recording properties for the inner track and the outer track or recording at high speed.

What is claimed is:

1. An optical information recording apparatus for forming a pit and a space on an optical recording medium by emitting a recording laser beam comprising at least a high output zone and a low output zone and for concurrently detecting the pit and space with a playback laser beam, the apparatus comprising:
   a beam splitter configured to divide a laser beam emitted by a laser diode into at least a recording laser beam and a playback laser beam;
   a retrieving circuit configured to retrieve a portion of a playback signal obtained in the high output zone of the recording laser beam from the playback signal obtained by emitting the playback laser beam, wherein the portion of the playback signal is retrieved concurrently with the emission of the recording laser beam;
   an averaging circuit configured to detect an average value of the retrieved playback signal;
   a peak value detecting circuit configured to detect a peak value of the retrieved playback signal; and
   an adjusting circuit configured to adjust the power of the recording laser beam based at least in part on the average value and the peak value.

2. The optical information recording apparatus according to claim 1, wherein the peak value comprises a maximum value and a minimum value of the retrieved playback signal, and wherein the adjusting circuit further comprises:
   a difference detecting circuit configured to determine a difference between the average value and the maximum value and a difference between the average value and the minimum value; and
   a β detecting circuit for computing a β equivalent value based at least in part on the differences;
   wherein the power is adjusted based at least in part on the β equivalent value.

3. The optical information recording apparatus according to claim 1, wherein the high output zone includes a constant output zone in which the level of the recording pulse remains constant, and wherein the playback signal is retrieved while the recording laser beam is being emitted in the constant output zone.

4. The optical information recording apparatus according to claim 1, wherein the beam splitter comprises a diffraction grating.

5. The optical information recording apparatus according to claim 1, wherein the beam splitter comprises at least a first diffraction grating and a second diffraction grating, the first and second diffraction gratings each comprising a plurality of grooves, wherein the grooves of the first diffraction grating are oriented in a direction that is different from a direction of orientation of the grooves of the second diffraction grating.

6. An optical information recording method for forming a pit and a space on an optical recording medium by emitting a recording laser beam comprising at least a high output zone and a low output zone and for concurrently detecting the pit and space with a playback laser beam, the method comprising the steps of:
   dividing a laser beam emitted by a laser diode into at least a recording laser beam and a playback laser beam;
   retrieving a portion of a playback signal obtained in the high output zone of the recording laser beam from the playback signal obtained by emitting the playback laser beam, wherein the portion of the playback signal is retrieved concurrently with the emission of the recording laser beam;
   detecting an average value and a peak value of the retrieved playback signal; and
   adjusting the power of the recording laser beam based at least in part on the detected average value and the peak value.

7. The optical information recording method according to claim 6, further comprising the steps of
   detecting an average value, a top value, and a bottom value of the playback signal; and
   determining the type of a code based at least in part on the detected average value, top value, and bottom value.

8. The optical information recording method according to claim 6, wherein an average value of the playback signal is detected and wherein a shift amount of at least one of the formed pit and the formed space is detected based at least in part on the detected average value.

9. The optical information recording method according to claim 6, wherein the dividing comprises emitting a laser beam onto a diffraction grating.

10. The optical information recording method according to claim 6, wherein the dividing comprises dividing a laser beam emitted from a laser diode into a first plurality of sub-beams, a first sub-beam of the first plurality comprising the playback laser beam, and wherein the dividing further comprises dividing a second sub-beam of the first plurality into a second plurality of sub-beams, the second plurality comprising the recording laser beam.

11. A signal processing circuit incorporated in an optical information recording apparatus for forming a pit and a space on an optical recording medium by emitting a recording laser beam comprising a high output zone and a low output zone and for concurrently detecting the pit and space with a playback laser beam, the signal processing circuit comprising:

a retrieving circuit configured to retrieve a portion of a playback signal obtained in the high output zone of the recording laser beam from the playback signal obtained by emitting the playback laser beam, the recording laser beam and the playback laser beam being generated by dividing a laser beam emitted from a laser diode, wherein the portion of the playback signal is retrieved concurrently with the emission of the recording laser beam;

an averaging circuit configured to detect an average value of the retrieved playback signal;

a peak value detecting circuit configured to detect a peak value of the retrieved playback signal; and an adjusting circuit configured to adjust the power of the recording laser beam based at least in part on the average value and the peak value.

12. The signal processing circuit according to claim 11, wherein the playback laser beam and the recording laser beam are generated when the laser beam emitted from the laser diode is incident on a diffraction grating.

\* \* \* \* \*

UNITED STATES PATENT AND TRADEMARK OFFICE
CERTIFICATE OF CORRECTION

PATENT NO. : 7,633,844 B2
APPLICATION NO. : 11/356803
DATED : December 15, 2009
INVENTOR(S) : Oyama et al.

It is certified that error appears in the above-identified patent and that said Letters Patent is hereby corrected as shown below:

Column 11, line 39, which reads, "value as an index", should read -- value serving as an index --

Column 11, line 44, which reads, "shift and a space", should read -- shift amount of a pit and a space --

Column 13, line 60, which reads, "constant output output", should read -- constant output --

Column 19, line 11, which reads, "the tangential pull", should read -- the tangential push pull --

Column 19, line 34, which reads, ""SL Δ(Tpp-Sub")"", should read -- "SL Δ(Tpp-Sub')" --

Signed and Sealed this

Third Day of August, 2010

David J. Kappos
*Director of the United States Patent and Trademark Office*